United States Patent
Yamanaka

(10) Patent No.: US 11,258,967 B2
(45) Date of Patent: Feb. 22, 2022

(54) IMAGING DEVICE AND METHOD OF DRIVING IMAGING DEVICE

(71) Applicant: CANON KABUSHIKI KAISHA, Tokyo (JP)

(72) Inventor: Shinji Yamanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/922,724

(22) Filed: Jul. 7, 2020

(65) Prior Publication Data
US 2021/0014439 A1 Jan. 14, 2021

(30) Foreign Application Priority Data
Jul. 9, 2019 (JP) .............................. JP2019-127445

(51) Int. Cl.
*H04N 5/355* (2011.01)
*H04N 9/04* (2006.01)
*H04N 5/369* (2011.01)
*H04N 5/378* (2011.01)

(52) U.S. Cl.
CPC ....... *H04N 5/35581* (2013.01); *H04N 5/3559* (2013.01); *H04N 5/3696* (2013.01); *H04N 9/04551* (2018.08); *H04N 5/378* (2013.01)

(58) Field of Classification Search
CPC ........... H04N 5/35581; H04N 9/04551; H04N 5/3559; H04N 5/3696; H04N 5/378; H04N 5/23254; H04N 5/2355; H04N 5/35554; H04N 5/332
See application file for complete search history.

(56) References Cited

U.S. PATENT DOCUMENTS

| 2008/0253758 | A1* | 10/2008 | Yap | ...................... | H04N 5/2351 |
| | | | | | 396/234 |
| 2017/0353675 | A1* | 12/2017 | Onuki | .................. | H04N 5/3745 |
| 2019/0088178 | A1* | 3/2019 | Ward | .................... | H04N 5/2327 |

FOREIGN PATENT DOCUMENTS

| JP | 2015-204488 A | 11/2015 |
| JP | 2016-10121 A | 1/2016 |
| JP | 2016-115953 A | 6/2016 |
| JP | 2016-213650 A | 12/2016 |
| JP | 2017-120971 A | 7/2017 |

* cited by examiner

*Primary Examiner* — Michael E Teitelbaum
(74) *Attorney, Agent, or Firm* — Canon U.S.A., Inc. IP Division

(57) ABSTRACT

An imaging device includes a drive unit that drives pixels each including a photoelectric converter to output a first signal based on charge generated by the photoelectric converter in a first exposure period and a second signal based on charge generated by the photoelectric converter in a second exposure period shorter than the first exposure period, a detection unit that detects a change in a relative position between an object and the imaging device by using the first and second signals, and an image generation unit that generates an image by using the first and second signals. When selecting the first or second signal for each pixel, in accordance with a result of determination whether the first signal is saturated, the image generation unit decides whether or not to use a detection result from the detection unit as a criterion in selecting the first or second signal.

28 Claims, 18 Drawing Sheets

FIG. 9A

| Mono | Mono | Mono | Mono |
|------|------|------|------|
| Mono | Mono | Mono | Mono |
| Mono | Mono | Mono | Mono |
| Mono | Mono | Mono | Mono |

FIG. 9B

| R | G | R | G |
|---|---|---|---|
| G | B | G | B |
| R | G | R | G |
| G | B | G | B |

FIG. 9C

| R  | G | R  | G |
|----|---|----|---|
| IR | B | IR | B |
| R  | G | R  | G |
| IR | B | IR | B |

FIG. 9D

| R | W | G | W |
|---|---|---|---|
| W | W | W | W |
| G | W | B | W |
| W | W | W | W |

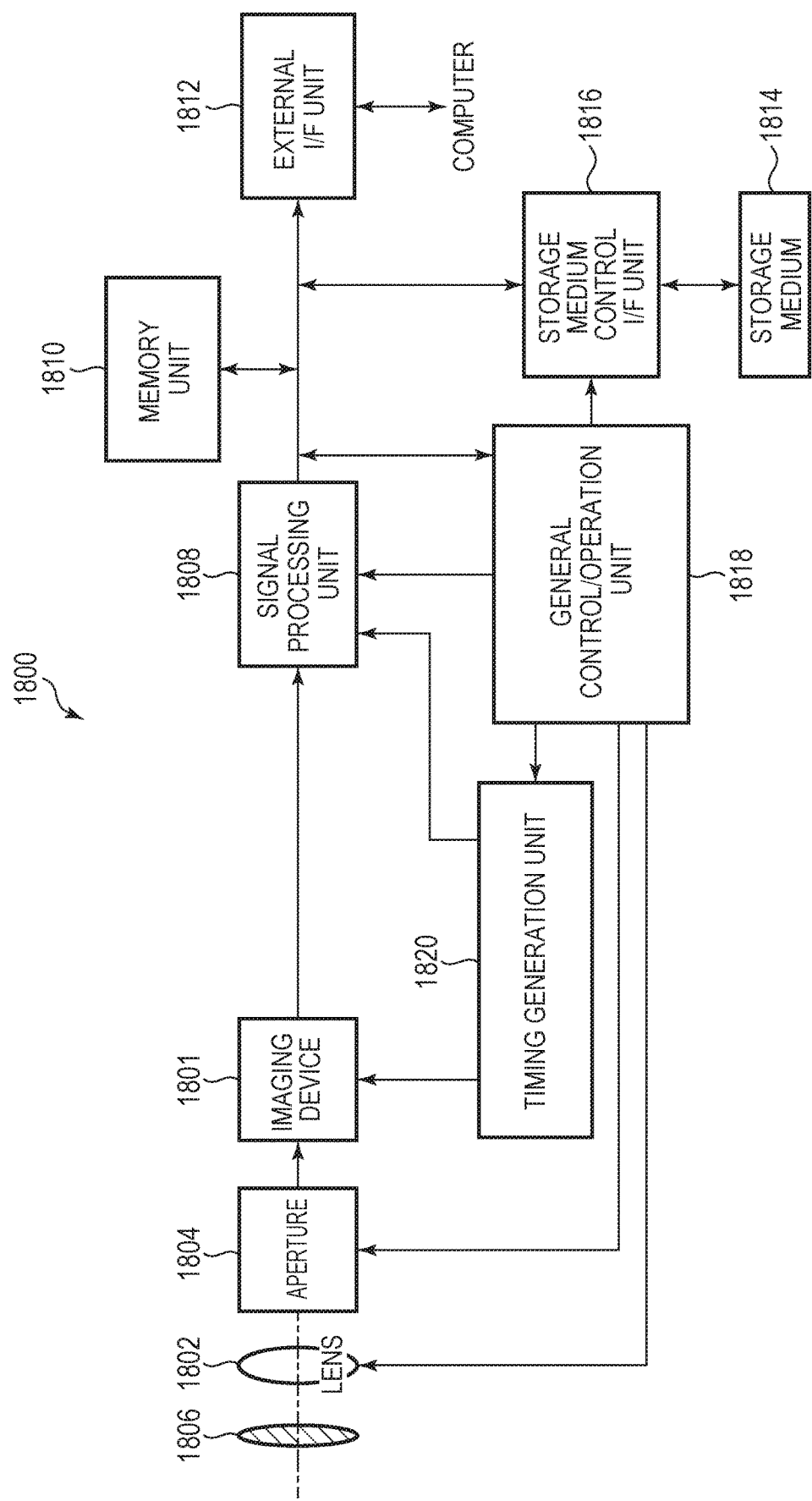

IMAGING DEVICE AND METHOD OF DRIVING IMAGING DEVICE

BACKGROUND

Field

One disclosed aspect of the embodiments relates to an imaging device and a method of driving the imaging device.

Description of the Related Art

In recent years, for imaging devices such as a CMOS image sensor, a technique of obtaining a high dynamic range (HDR) by composing a plurality of images captured in different conditions has been proposed. Japanese Patent Application Laid-Open No. 2017-120971 discloses an imaging device that generates an HDR image from two images acquired at different timings.

However, the imaging device disclosed in Japanese Patent Application Laid-Open No. 2017-120971 is to acquire two types of images captured in different conditions and replace a pixel value of a saturated pixel in one of the images with a pixel value obtained by performing predetermined digital processing on a pixel value of a corresponding pixel in the other image. Thus, when the relative position between an object and an imaging device changes, such as when the object moves during the acquisition of the above two types of images, it is not possible to perform suitable HDR composition.

SUMMARY

An aspect of the embodiments intends to provide an imaging device and a method of driving the imaging device that may acquire a good image even when the relative position between an object and the imaging device changes during capturing.

According to one aspect of an embodiment, provided is an imaging device including a pixel unit in which a plurality of pixels each including a photoelectric converter are arranged, a drive unit that drives the plurality of pixels to output, from each of the plurality of pixels, a first signal based on charge generated by the photoelectric converter in a first exposure period and a second signal based on charge generated by the photoelectric converter in a second exposure period that is shorter than the first exposure period, a detection unit that detects a change in a relative position between an object and the imaging device by using the first signal and the second signal, and an image generation unit that generates an image by using the first signal and the second signal. The image generation unit is configured to select one of the first signal and the second signal for each of the plurality of pixels in generating the image, and the image generation unit performs determination as to whether or not the first signal is saturated and, in accordance with a result of the determination, decides whether or not to use a result of detection performed by the detection unit as a criterion in selecting one of the first signal and the second signal.

Further, according to another aspect of an embodiment, provided is an imaging device including a pixel unit in which a plurality of pixels each including a photoelectric converter are arranged, a drive unit that drives the plurality of pixels to output, from each of the plurality of pixels, a first signal based on charge generated by the photoelectric converter in a first exposure period and a second signal based on charge generated by the photoelectric converter in a second exposure period that is shorter than the first exposure period, a detection unit that detects a change in a relative position between an object and the imaging device by using the first signal and the second signal, and an image generation unit that generates an image by using the first signal and the second signal. In generating the image, the image generation unit selects the first signal for a pixel for which the detection unit detects that a change in the relative position is relatively small, selects the second signal for a pixel for which the detection unit detects that a change in the relative position is relatively large, and selects the second signal for a pixel in which the first signal is saturated regardless of a result of detection performed by the detection unit.

Further, according to yet another aspect of an embodiment, provided is a signal processing device that processes a first signal output from each of a plurality of pixels of an imaging device and based on charge generated by a photoelectric converter in a first exposure period and a second signal output from each of the plurality of pixels of the imaging device and based on charge generated by the photoelectric converter in a second exposure period that is shorter than the first exposure period. The signal processing device includes a detection unit that detects a change in a relative position between an object and the imaging device by using the first signal and the second signal, and an image generation unit that generates an image by using the first signal and the second signal. The image generation unit is configured to select one of the first signal and the second signal for each of the plurality of pixels in generating the image, and the image generation unit performs determination as to whether or not the first signal is saturated and, in accordance with a result of the determination, decides whether or not to use a result of detection performed by the detection unit as a criterion in selecting one of the first signal and the second signal.

Further, according to yet another aspect of an embodiment, provided is a signal processing device that processes a first signal output from each of a plurality of pixels of an imaging device and based on charge generated by a photoelectric converter in a first exposure period and a second signal output from each of the plurality of pixels of the imaging device and based on charge generated by the photoelectric converter in a second exposure period that is shorter than the first exposure period. The signal processing device includes a detection unit that detects a change in a relative position between an object and the imaging device by using the first signal and the second signal, and an image generation unit that generates an image by using the first signal and the second signal. In generating the image, the image generation unit selects the first signal for a pixel for which the detection unit detects that a change in the relative position is relatively small, selects the second signal for a pixel for which the detection unit detects that a change in the relative position is relatively large, and selects the second signal for a pixel in which the first signal is saturated regardless of a result of detection performed by the detection unit.

Further, according to yet another aspect of an embodiment, provided is a method of driving an imaging device including an imaging device including a plurality of pixels each including a photoelectric converter and a signal processing unit that processes a signal output from the imaging device. The method includes outputting, from each of the plurality of pixels, a first signal based on charge generated by the photoelectric converter in a first exposure period and a second signal based on charge generated by the photoelectric converter in a second exposure period that is shorter than the first exposure period, detecting a change in a relative position between an object and the imaging device by using the first signal and the second signal, and generating an image by using the first signal and the second signal. In the step of generating an image, in selecting one of the first signal and the second signal for each of the plurality of pixels, determination is performed as to whether or not the first signal is saturated and, in accordance with a result of the determination, it is decided whether or not to use a result of detection performed by the detection unit as a criterion in selecting one of the first signal and the second signal.

Further, according to yet another aspect of an embodiment, provided is a method of driving an imaging device including an imaging device including a plurality of pixels each including a photoelectric converter and a signal processing unit that processes a signal output from the imaging device. The method includes outputting, from each of the plurality of pixels, a first signal based on charge generated by the photoelectric converter in a first exposure period and a second signal based on charge generated by the photoelectric converter in a second exposure period that is shorter than the first exposure period, detecting a change in a relative position between an object and the imaging device by using the first signal and the second signal, and generating an image by using the first signal and the second signal. In the step of generating an image, the first signal is selected for a pixel for which it is detected that a change in the relative position is relatively small, the second signal is selected for a pixel for which it is detected that a change in the relative position is relatively large, and the second signal is selected for a pixel in which the first signal is saturated regardless of a result of detection of motion of the object.

Further features of the disclosure will become apparent from the following description of exemplary embodiments with reference to the attached drawings.

BRIEF DESCRIPTION OF THE DRAWINGS

FIG. 9A, FIG. 9B, FIG. 9C, and FIG. 9D are diagrams each illustrating a configuration example of an optical filter provided to the imaging element.

FIG. 18 is a block diagram illustrating a general configuration of an imaging system according to a fourth embodiment.

DESCRIPTION OF THE EMBODIMENTS

Preferred embodiments of the disclosure will now be described in detail in accordance with the accompanying drawings.

First Embodiment

An imaging device and a method of driving the same according to a first embodiment of the disclosure will be described with reference to FIG. 1 to FIG. 13.

Figure 1:
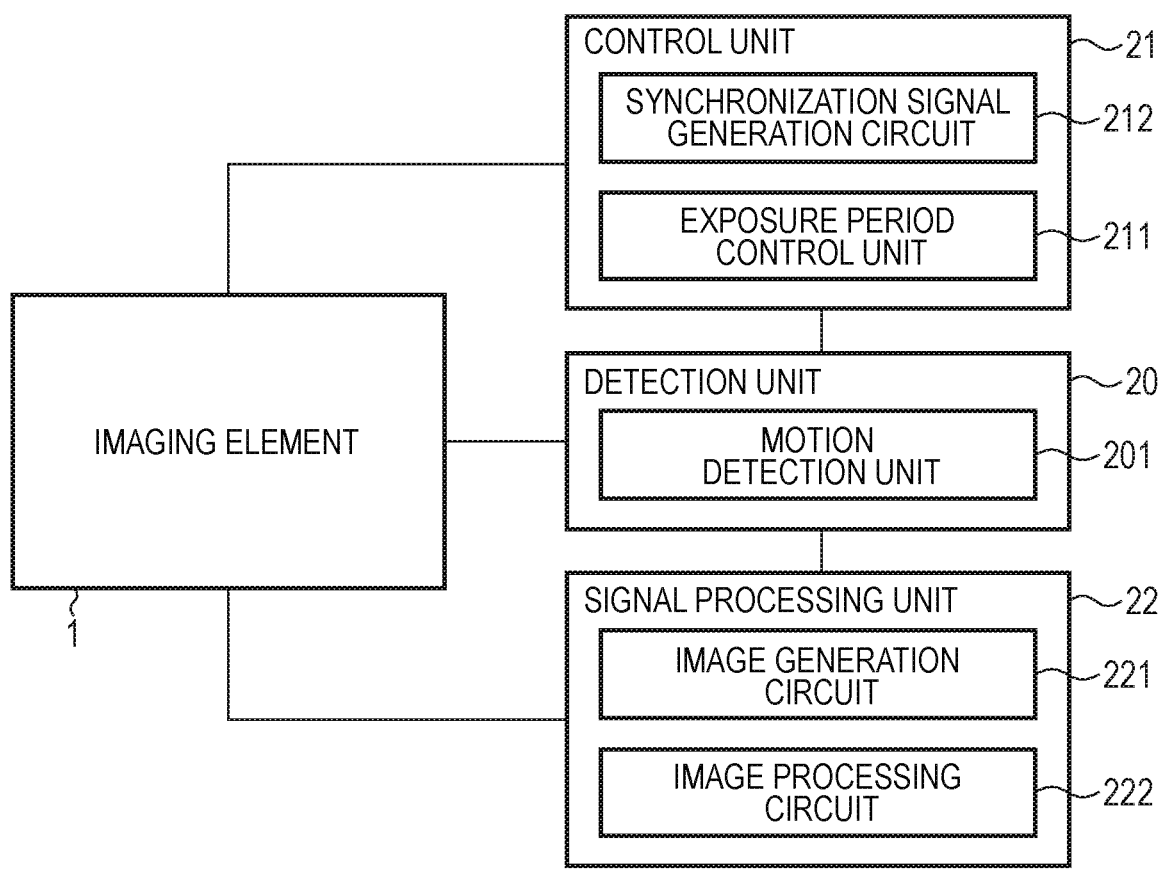
FIG. 1 is a block diagram illustrating a general configuration of an imaging device according to a first embodiment.
Figure 2:
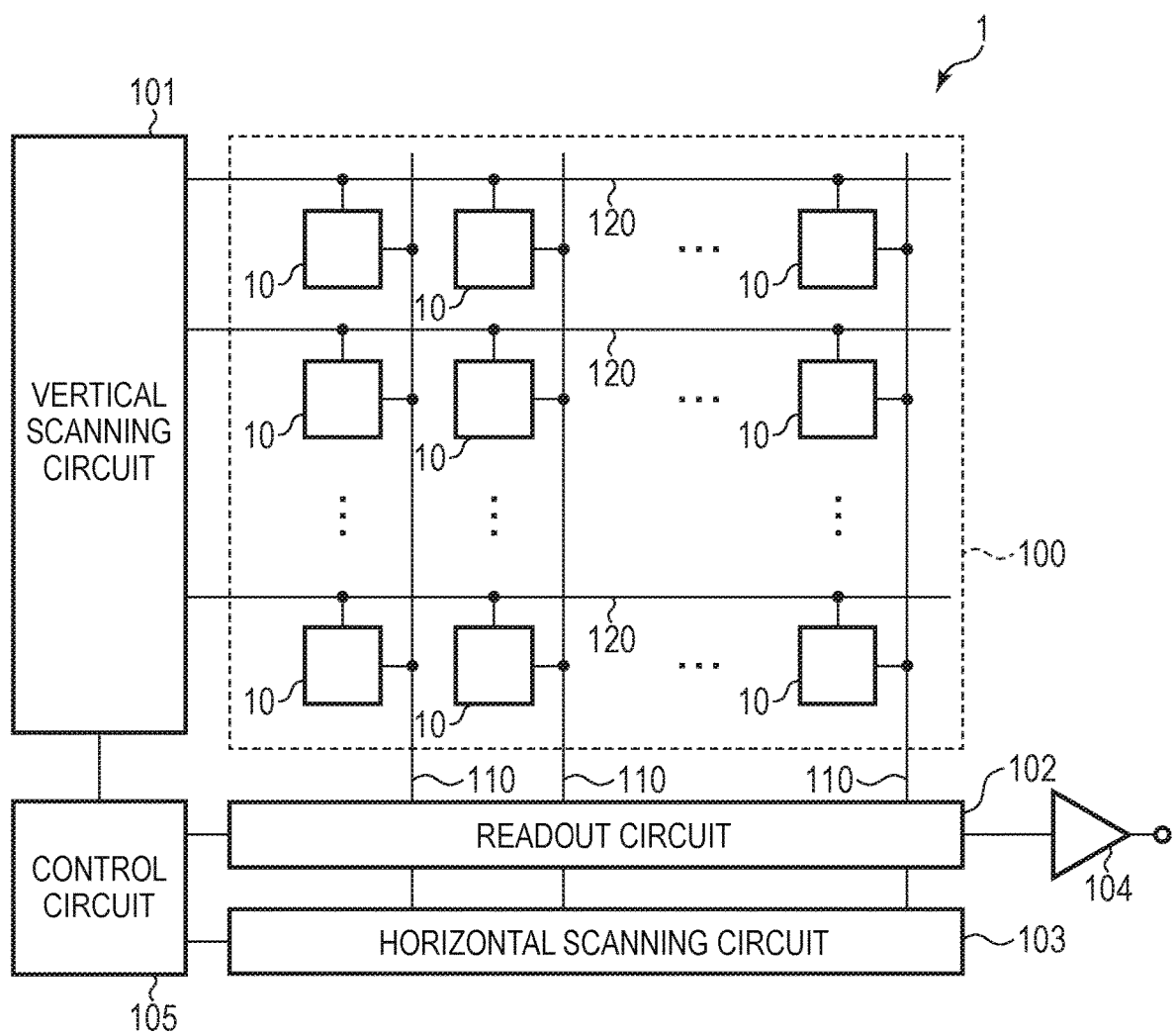
FIG. 2 is a block diagram illustrating a general configuration of an imaging element in the imaging device according to the first embodiment.
Figure 3:
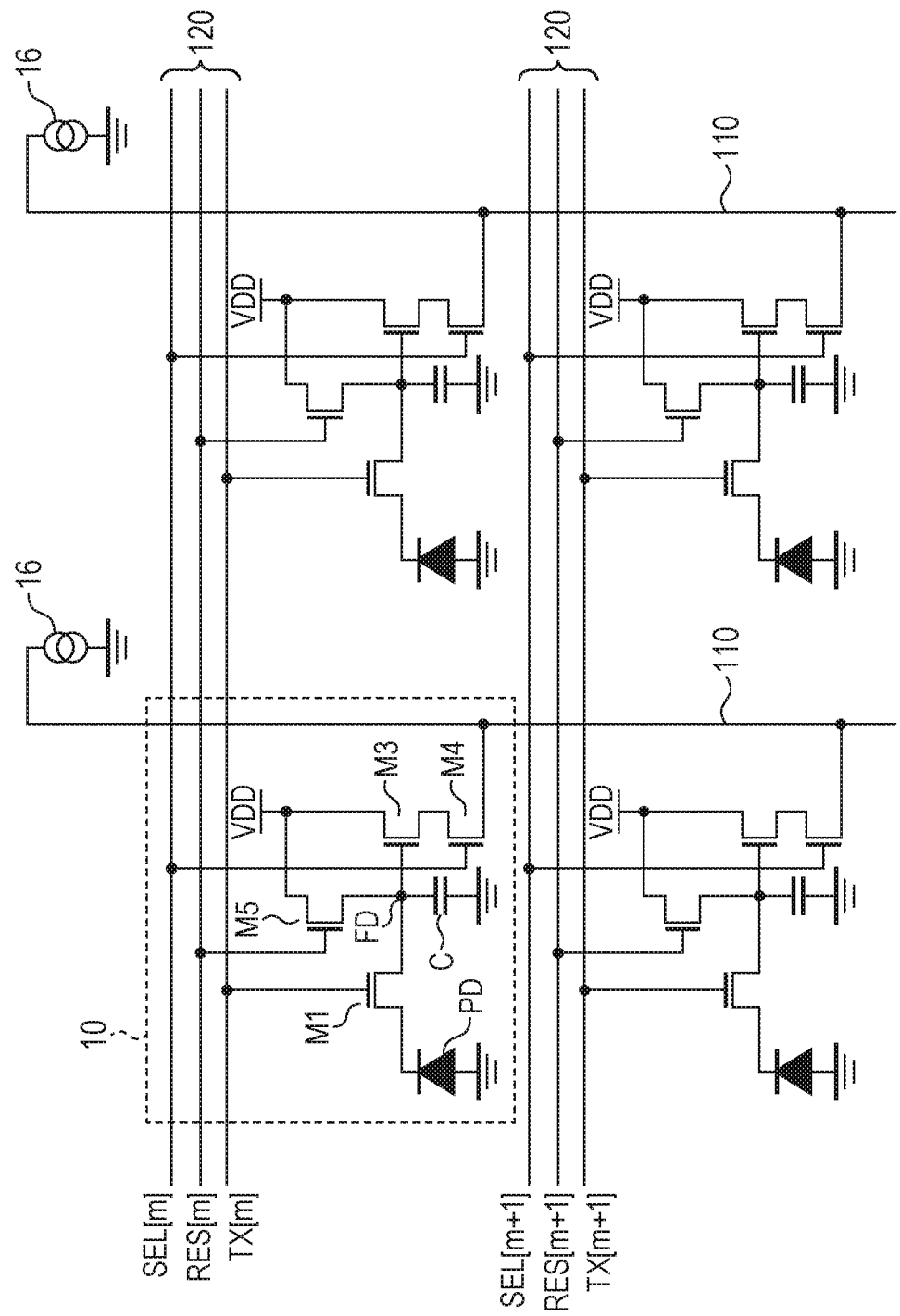
FIG. 3 is an equivalent circuit diagram illustrating a configuration example of pixels of the imaging element in the imaging device according to the first embodiment.

First, a general configuration of the imaging device according to the present embodiment will be described with reference to FIG. 1 to FIG. 3. FIG. 1 is a block diagram illustrating a general configuration of an imaging device according to the present embodiment. FIG. 2 is a block diagram illustrating a general configuration of an imaging element in the imaging device according to the present embodiment. FIG. 3 is an equivalent circuit diagram illustrating a configuration example of a pixel of the imaging element in the imaging device according to the present embodiment.

As illustrated in FIG. 1, the imaging device according to the present embodiment includes an imaging element 1, a detection unit 20, a control unit 21, and a signal processing unit 22.

The imaging element 1 is a solid-state imaging element such as a complementary metal oxide semiconductor (CMOS) image sensor, for example. The imaging element 1 receives an object image converged by an optical system (not illustrated) and outputs an image signal in accordance with the object image.

The detection unit 20 includes a motion detection unit 201. The motion detection unit 201 detects a change in the relative position (motion) between an object and the imaging device during capturing from two image signals with different lengths of exposure periods output from the imaging element 1. Herein, the change in the relative position between an object and the imaging device includes a case where the object is moving, a case where the imaging device is moving, and a case where both the object and the imaging device are moving. The motion detection unit 201 compares a long-time image signal with a short-time image signal and detects a change in the relative position between an object and the imaging device based on a ratio, a difference, a correlation, or the like of pixel values at the same location (coordinates). Note that the long-time image signal is an image signal obtained when capturing is performed under a condition of a relatively long exposure period compared to a short-time image signal. The short-time image signal is an image signal obtained when capturing is performed under a condition of a relatively short exposure period compared to the long-time image signal.

The control unit 21 includes an exposure period control unit 211 and a synchronization signal generation circuit 212. The exposure period control unit 211 determines an exposure period and a start timing of exposure based on a detection result such as a blinking-detection unit (not illustrated). The synchronization signal generation circuit 212 includes a clock circuit and a gate circuit (not illustrated) and generates a vertical synchronization signal and a horizontal synchronization signal.

The signal processing unit 22 is formed of a digital circuit such as a digital signal processor (DSP) and includes an image generation circuit (image generation unit) 221 and an image processing circuit 222. The image generation circuit 221 composes two signals of different lengths of exposure periods and generates a high dynamic range (HDR) image. The image processing circuit 222 performs processing such as color carrier removal, noise removal, aperture correction, gamma correction, color interpolation, data compression, or the like on an image signal output from the imaging element 1 and outputs the processed image signal as a moving image bitstream. Note that the signal processing unit 22 is not necessarily required to be included in the imaging device and may be provided in a separate device from the imaging device.

As illustrated in FIG. 2, the imaging element 1 includes a pixel unit 100, a vertical scanning circuit (drive unit) 101, a readout circuit 102, a horizontal scanning circuit 103, an output circuit 104, and a control circuit 105.

In the pixel unit 100, a plurality of pixels 10 arranged in a matrix over a plurality of rows and a plurality of columns are provided. Note that, in the present specification, the row direction represents the horizontal direction in a drawing, and the column direction represents the vertical direction in the drawing. An optical structure such as micro-lenses, a color filter, or the like may be arranged over respective pixels 10. The color filter is a primary-color filter of red, blue, and green, for example, and may be arranged on respective pixels 10 in accordance with the Bayer arrangement. Some of the plurality of pixels 10 forming the pixel unit 100 may be arranged in a light-shielded region as optical black pixels (OB pixels) used for outputting a reference signal. Further, another some of the plurality of pixels 10 forming the pixel unit 100 may be pixels that output no pixel signal, such as a dummy pixel having no photoelectric converter. The pixel unit 100 may include a plurality of capturing rows on which capturing pixels that output pixel signals used for generating an image are arranged and a ranging row on which focus detection pixels that output pixel signals used for focus detection are arranged.

On each row of the pixel unit 100, a control line 120 extending in the row direction is arranged. The control line 120 on each row is connected to the pixels 10 belonging to a corresponding row to form a signal line common to these pixels. The control lines 120 are connected to the vertical scanning circuit 101.

The vertical scanning circuit 101 is formed of a shift register, a gate circuit, a buffer circuit, or the like and generates control signals used for driving the pixels 10 based on a vertical synchronization signal, a horizontal synchronization signal, a clock signal, or the like. The vertical scanning circuit 101 outputs the control signals to the pixels 10 via the control lines 120 and drives the pixels 10 on a row basis.

On each column of the pixel unit 100, a column signal line 110 extending in the column direction is arranged. The column signal line 110 on each column is connected to the pixels 10 belonging to a corresponding column to form a signal line common to these pixels. The pixels 10 on a row selected by the vertical scanning circuit 101 output pixel signals at the same time to corresponding column signal lines 110, respectively. The column signal lines 110 are connected to the readout circuit 102.

The readout circuit 102 is a circuit unit that performs predetermined processing, for example, signal processing such as an amplification process, a correlated double sampling (CDS) process, or the like on pixel signals read out from the pixels 10.

The horizontal scanning circuit 103 supplies, to the readout circuit 102, control signals used for transferring pixel signals processed by the readout circuit 102 to the output circuit 104 sequentially on a column basis.

The output circuit 104 is formed of a buffer amplifier, a differential amplifier, or the like and outputs a pixel signal from the readout circuit 102 to a signal processing unit outside the imaging element 1. For example, an analog-to-digital (AD) converter unit may be provided in the readout circuit 102 to output a pixel signal converted into a digital signal from the imaging element 1.

The control circuit 105 generates various control signals or drive signals based on a clock signal, a synchronization signal, or the like and controls the vertical scanning circuit 101, the readout circuit 102, and the horizontal scanning circuit 103 by using the control signal or the drive signal.

FIG. 3 is an equivalent circuit diagram illustrating a configuration example of the pixel 10. FIG. 3 illustrates four pixels 10 arranged in a matrix of two rows by two columns out of the plurality of pixels 10 forming the pixel unit 100. Note that the number of pixels 10 forming the pixel unit 100 is not particularly limited.

As illustrated in FIG. 3, each of the pixels 10 includes a photoelectric converter PD, a transfer transistor M1, an amplifier transistor M3, a select transistor M4, and a reset transistor M5. The photoelectric converter PD is a photodiode, for example. The photodiode forming the photoelectric converter PD has the anode connected to a reference voltage node and the cathode connected to the source of the transfer transistor M1. The drain of the transfer transistor M1 is connected to the gate of the amplifier transistor M3 and the source of the reset transistor M5. The connection node of the drain of the transfer transistor M1, the gate of the amplifier transistor M3, and the source of the reset transistor M5 is a so-called floating diffusion portion FD. The parasitic capacitance (FD capacitance) between the floating diffusion portion FD and another diffusion region or an interconnection has a function of a charge holding portion. FIG. 3 illustrates this capacitance as a capacitor C connected to the floating diffusion portion FD. The drain of the amplifier transistor M3 and the drain of the reset transistor M5 are connected to a power supply node (voltage VDD). The source of the amplifier transistor M3 is connected to the drain of the select transistor M4. The source of the select transistor M4 is connected to the column signal line 110. A current source 16 is connected to the column signal line 110 on each column. Note that, although the example in which each of the pixels 10 includes the amplifier transistor M3 is illustrated in the equivalent circuit diagram of FIG. 3, a single amplifier transistor M3 may be shared by a plurality of pixels 10.

In the case of the pixel configuration of FIG. 3, the control line 120 arranged on each row includes signal lines TX, RES, and SEL. The signal line TX is connected to the gates of the transfer transistors M1 of the pixels 10 belonging to a corresponding row. The signal line RES is connected to the gates of the reset transistors M5 of the pixels 10 belonging to a corresponding row. The signal line SEL is connected to the gates of the select transistors M4 of the pixels 10 belonging to a corresponding row. FIG. 3 illustrates signal lines TX[m], RES[m], and SEL[m] as the control line 120 connected to the pixels 10 belonging to the m-th row and signal lines TX[m+1], RES[m+1], and SEL[m+1] as the control line 120 connected to the pixels 10 belonging to the (m+1)-th row.

Drive pulses used for controlling the transfer transistors M1 are output from the vertical scanning circuit 101 to the signal line TX. Drive pulses used for controlling the reset transistors M5 are output from the vertical scanning circuit 101 to the signal line RES. Drive pulses used for controlling the select transistors M4 are output from the vertical scanning circuit 101 to the signal line SEL. Common drive pulses are supplied from the vertical scanning circuit 101 to the pixels 10 on the same row. When each transistor is formed of an n-channel transistor, the corresponding transistor is turned on when a high-level control signal is supplied from the vertical scanning circuit 101, and the corresponding transistor is turned off when a low-level control signal is supplied from the vertical scanning circuit 101. It is also possible to simultaneously control the exposure period of the plurality of pixels 10 by controlling the control signals on respective rows at the same time. Accordingly, global electronic shutter can be realized, for example.

The photoelectric converter PD converts (photoelectrically converts) incident light into charge in accordance with the light amount and accumulates generated charge. When turned on, the reset transistor M5 resets the floating diffusion portion FD to a voltage in accordance with the voltage VDD. When turned on, the transfer transistor M1 transfers charge accumulated in the photoelectric converter PD to the floating diffusion portion FD. Thereby, the voltage of the floating diffusion portion FD becomes a voltage in accordance with the amount of charge transferred from the photoelectric converter PD by charge-to-voltage conversion with the capacitor C. The amplifier transistor M3 is configured such that the voltage VDD is supplied to the drain and a bias current is supplied to the source from the current source 16 via the select transistor M4 and the column signal line 110 and forms an amplifier unit (source follower circuit) whose gate is the input node. Thereby, the amplifier transistor M3 outputs a signal in accordance with the voltage of the floating diffusion portion FD to the column signal line 110 via the select transistor M4. The pixel signal output to the column signal line 110 is input to the readout circuit 102.

Figure 4:
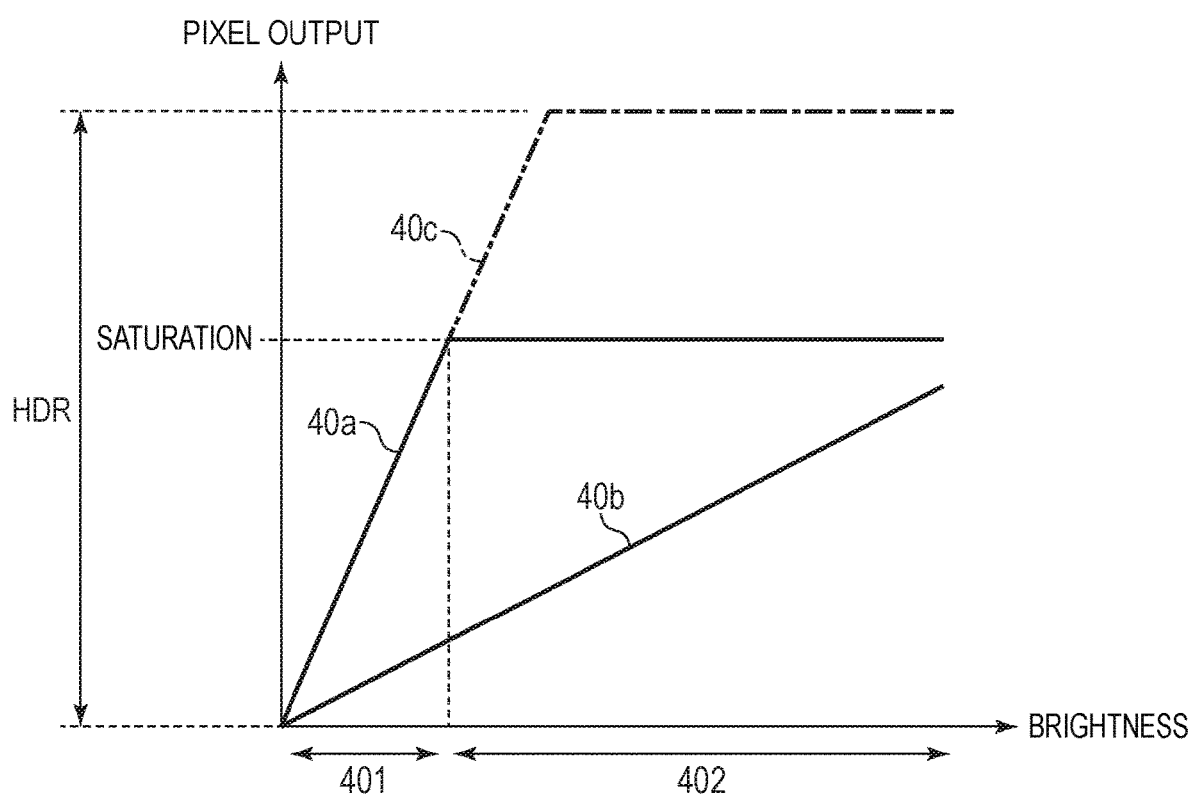
FIG. 4 is a diagram illustrating a composition method of an HDR image.

Next, a composition method of an HDR image will be described with reference to FIG. 4. FIG. 4 is a diagram illustrating the composition method of an HDR image. The horizontal axis illustrates the amount of light entering the pixel 10 (brightness of an object), and the vertical axis illustrates the level of a pixel signal output from the pixel 10.

Composition of the HDR image is performed by combining a pixel signal based on charge generated during a relatively long charge accumulation period and a pixel signal based on charge generated during a relatively short charge accumulation period. In FIG. 4, a pixel signal 40a represents a pixel signal based on charge generated during a relatively long charge accumulation period. A pixel signal 40b represents a pixel signal based on charge generated during a relatively short charge accumulation period.

In the following description, the charge accumulation period of the pixel signal 40a (first exposure period) is referred to as a long-time exposure period, and the charge accumulation period of the pixel signal 40b (second exposure period) is referred to as a short-time exposure period. Further, an operation to perform a relatively long period of charge accumulation is referred to as long-time exposure, and an operation to perform a relatively short period of charge accumulation is referred to as short-time exposure. The length of a long-time exposure period may be around 200 times the length of the short-time exposure period, for example, but may be suitably changed in accordance with an imaging device.

The level of the pixel output denoted as "saturation" in FIG. 4 corresponds to the level of a pixel output corresponding to a saturation charge amount of the photoelectric converter PD. Since the charge accumulation period is relatively longer for the pixel signal 40a than for the pixel signal 40b, a ratio (slope) of an increase in the pixel output relative to the light amount is larger in the pixel signal 40a than in the pixel signal 40b, and the pixel signal 40a reaches a saturation level with a less light amount than the pixel signal 40b.

When an object is dark as illustrated as a region 401 in FIG. 4, neither the pixel signal 40a nor the pixel signal 40b is saturated. In such a case, by using the pixel signal 40a, it is possible to obtain an image having a high signal-to-noise ratio. On the other hand, when an object is bright as illustrated as a region 402 in FIG. 4, the pixel signal 40b is not saturated but the pixel signal 40a is saturated. Accordingly, the image generation circuit 221 amplifies the pixel signal 40b in the region 402 by digital signal processing and replaces the saturated pixel signal 40a with an image signal 40c amplified from the pixel signal 40b. Thereby, a high dynamic range image (HDR image) exceeding a saturation level of the pixel signal 40a can be generated.

Figure 5:
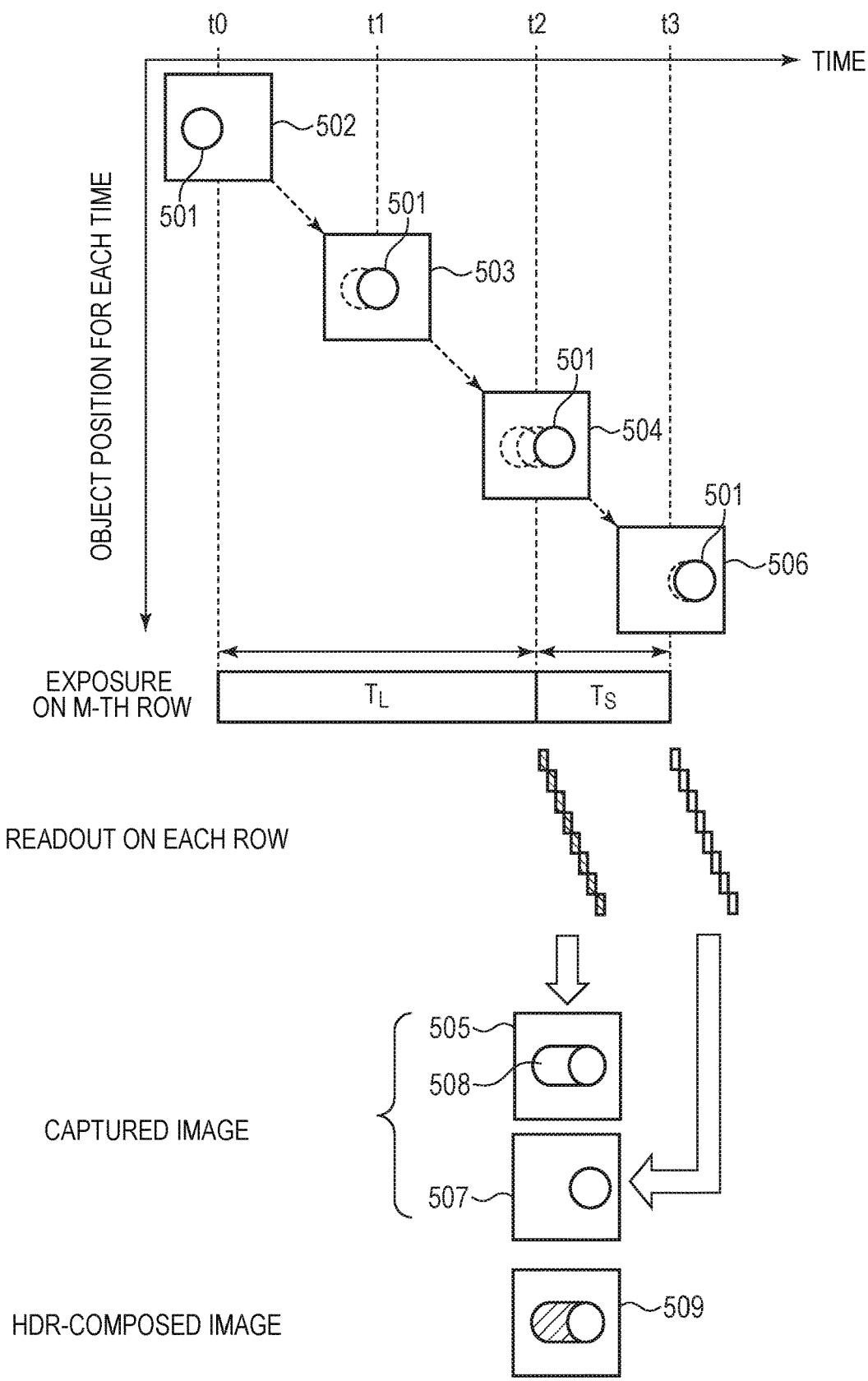
FIG. 5 is a diagram illustrating a problem during capturing of an HDR image.

FIG. 5 is a diagram illustrating a problem during capturing of an HDR image. FIG. 5 schematically illustrates an image captured with long-time exposure and short-time exposure when an object is moving. To simplify the illustration here, it is assumed that an object 501 is moving at a constant speed during a period from time t0 to time t3.

At time t0, the object 501 is captured at the position indicated in an image 502. At subsequent time t1, the object 501 is captured at the position indicated in an image 503. At subsequent time t2, the object 501 is captured at the position indicated in an image 504. Therefore, when exposure is continuously performed during the period from time t0 to time t2, every object 501 from the position of the image 502 to the position of the image 504 is captured, and as a result, a residual image 508 of the object 501 appears in a captured image 505. It is assumed here that a period from time t0 to time t2 is denoted as a long-time exposure period $T_L$, and hereafter, the image 505 is referred to as a long-time image 505. The long-time image 505 is an image formed by a pixel signal in accordance with the amount of charge accumulated in the photoelectric converter PD during the long-time exposure period $T_L$.

At time t3, the object 501 is captured at the position indicated in an image 506. The period from time t2 to time t3 is shorter than the period from time t0 to time t2, and the moving distance of the object is also shorter. Therefore, an image 507 captured by continuous exposure in the period from time t2 to time t3 has a less residual image than the long-time image 505. Here, the period from time t2 to time t3 is referred to as a short-time exposure period $T_S$, and hereafter, the image 507 is referred to as a short-time image 507. The short-time image 507 is an image formed by a pixel signal in accordance with the amount of charge accumulated in the photoelectric converter PD during the short-time exposure period $T_S$.

When the long-time image 505 and the short-time image 507 are composed by using a method of generating an HDR image described above (HDR composition), the pixel value of a pixel saturated in the long-time image 505 is replaced with a value obtained by performing digital signal processing (amplification process) on a pixel value of a pixel of the short-time image 507 at the same coordinate. It is expected, however, that a portion in which the residual image 508 is captured in the long-time image 505 has a pixel value including mixed various pieces of information, because the object 501 is captured at the time of passage of the object 501 and the background is captured at the remaining time. Therefore, when various pieces of information are mixed in a portion of the residual image 508 and the portion of the residual image 508 is not saturated, the pixel value of the portion will be used for HDR composition without being replaced with a value based on the pixel value of the short-time image 507. As a result, unsuitable pixel value is used for the portion of the residual image 508 in the HDR composition, and a desired image may be unable to be obtained as an HDR composite image 509.

Figure 6:
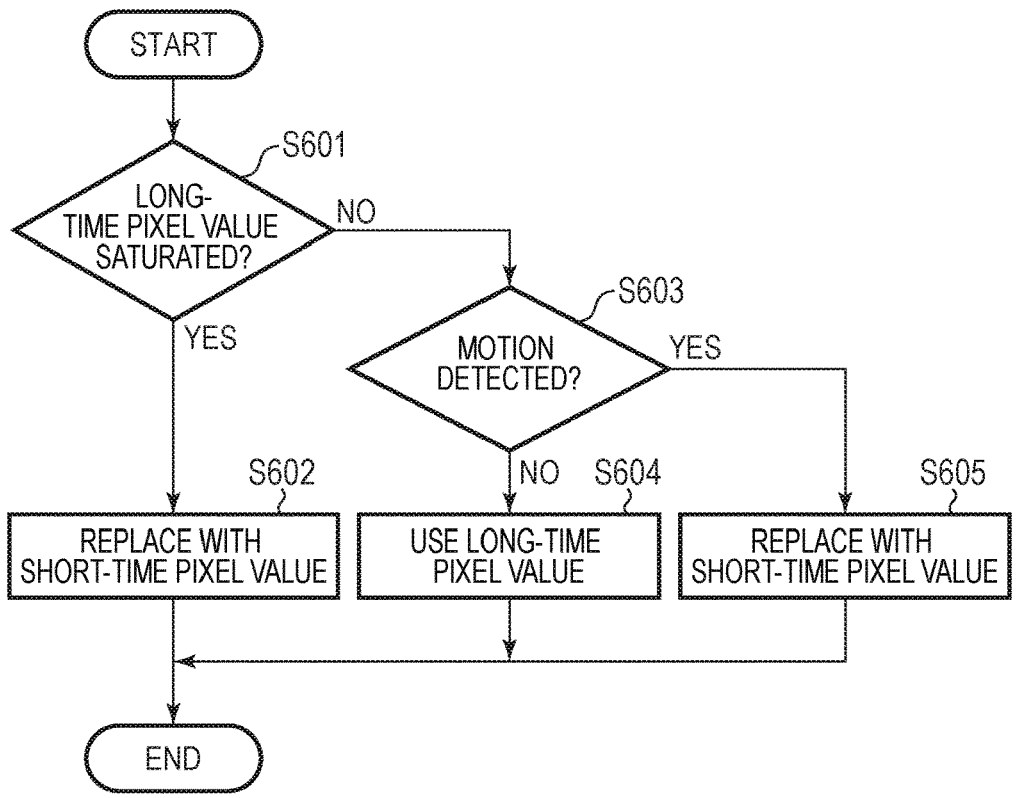
FIG. 6 is a flowchart illustrating a method of driving the imaging device according to the first embodiment.

In view of the above, in the imaging device according to the present embodiment, the above problem is solved by performing the HDR composition process in accordance with the flowchart illustrated in FIG. 6. The HDR composition process may be performed by the signal processing unit 22.

First, in step S601, the signal processing unit 22 determines whether or not a pixel value of the long-time image 505 is saturated. As a result of the determination, if the pixel value of the long-time image 505 is saturated (YES), the process proceeds to step S602 to decide to replace a pixel value of the saturated long-time image 505 with a value based on a pixel value of the short-time image 507 and use the replaced value in the HDR composition. As a result of the determination, if the pixel value of the long-time image 505 is not saturated (NO), the process proceeds to step S603.

In step S603, motion detection of the object 501 is performed, and it is determined whether or not the relative position between the object 501 and the imaging device is changing at the time of capturing. As a result of the determination, if the change in the relative position between the object 501 and the imaging device is relatively small (static) (NO), the process proceeds to step S604 to decide to use the pixel value of the long-time image 505 for the HDR composition. As a result of the determination, if the change in the relative position between the object 501 and the imaging device is relatively large (moving) (YES), the process proceeds to step S605.

In step S605, it is decided to replace the pixel value of the long-time image 505 in which motion has been detected in step S603 with a value based on the pixel value of the short-time image 507 and use the replaced value for the HDR composition.

The motion detection in step S603 is performed by the motion detection unit 201 of the detection unit 20. Here, the motion detection method in the motion detection unit 201 will be described with reference to FIG. 7.

In general, a long-time exposure period and a short-time exposure period in the HDR composition are set so as to have a particular correlation. For example, the long-time exposure period is set to be constant-number times the short-time exposure period (this magnification is denoted as Exp_Ratio). It is considered that, when a static object is captured, such a correlation is the same as the correlation between the pixel value of a long-time image and the pixel value of a short-time image at the same coordinates for the pixel 10 having a general luminance linearity. When the long-time exposure period is set to be constant-number times the short-time exposure period as described above, the relationship between the pixel value of a long-time image (long-time pixel value) and the pixel value of a short-time image (short-time pixel value) is expressed by Equation (1) below.

long-time pixel value=short-time pixel value×Exp_Ratio     (1)

Figure 7:
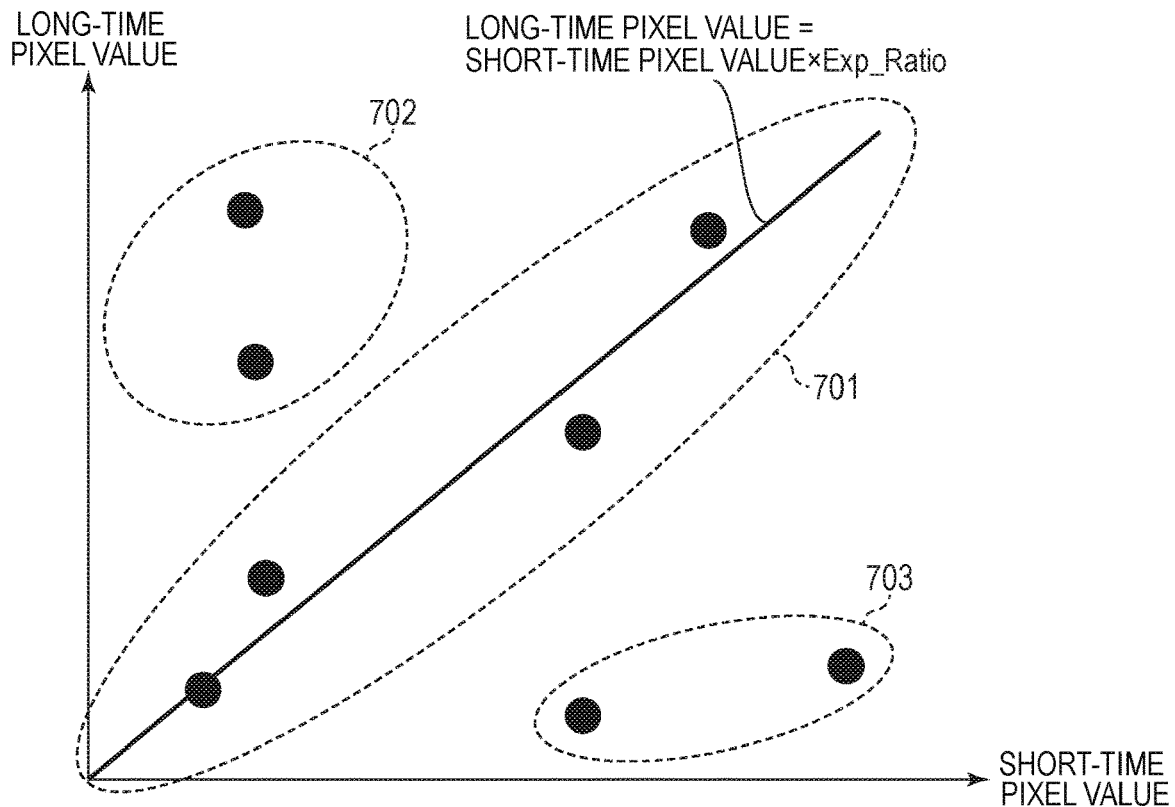
FIG. 7 is a diagram illustrating a motion detection method in the imaging device according to the first embodiment.

When the pixel values at the same coordinates in a long-time image and a short-time image are represented in a graph where the horizontal axis represents the pixel value of the short-time image and the vertical axis represents the pixel value of the long-time image, the above relationship expressed by Equation (1) is represented as illustrated in FIG. 7. That is, when a point represented by the pixel values at the same coordinates in a long-time image and a short-time image is located near the straight line illustrated in FIG. 7, it can be considered that the relative position relationship between the imaging device and an object is not changed. For example, when the point represented by the pixel value of a long-time image and the pixel value of a short-time image is located in a range 701 in FIG. 7, it can be determined that the change in the relative position between the object 501 and the imaging device is relatively small (static).

On the other hand, when the point represented by the pixel values at the same coordinates in a long-time image and a short-time image is apart from the straight line illustrated in FIG. 7, it can be considered that different objects have been captured at the time of capturing the long-time image and at the time of capturing the short-time image. For example, when a point represented by the pixel value of a long-time image and the pixel value of a short-time image is located in a range 702 or a range 703 in FIG. 7, it can be determined that the change in the relative position between the object 501 and the imaging device is relatively large (moving).

In such a way, when the point represented by the pixel values at the same coordinates in a long-time image and a short-time image is located in the range 701, the motion detection unit 201 can determine that the object 501 and the imaging device are static. Further, when the point represented by the pixel values at the same coordinates in a long-time image and a short-time image is located in the range 702 or 703, the motion detection unit 201 can determine that the object 501 or the imaging device is moving. In FIG. 7, the ranges 701, 702, and 703 may be set anywhere.

Note that a method of recognizing the correlation between the pixel value of a short-time image and the pixel value of a long-time image is not limited to the example illustrated in FIG. 7. For example, it is possible to take a difference between the pixel value of a short-time image and the pixel value of a long-time image and determine the correlation in accordance with the level of the difference. At this time, the level of a difference used as a threshold value can be suitably set. This setting of a threshold value is changed in accordance with the length of the exposure period of at least one of a long-time image and a short-time image, for example. For example, the length of the exposure period of a long-time image is set to be longer in capturing in a dark scene such as at nighttime. As the length of an exposure period of a long-time image is longer, relative motion of the object 501 and the imaging device is likely to affect a blur of the long-time image. Therefore, as the length of the exposure period of a long-time image is longer, the threshold value is set to be smaller. Further, the threshold value may be changed in accordance with the length of the exposure period of a short-time image. Further, the threshold value may be changed based on the length of the exposure periods of both a short-time image and a long-time image.

Next, advantageous effects obtained by the HDR composition process using the flow illustrated in FIG. 6 will be described with reference to FIG. 8.

Figure 8:
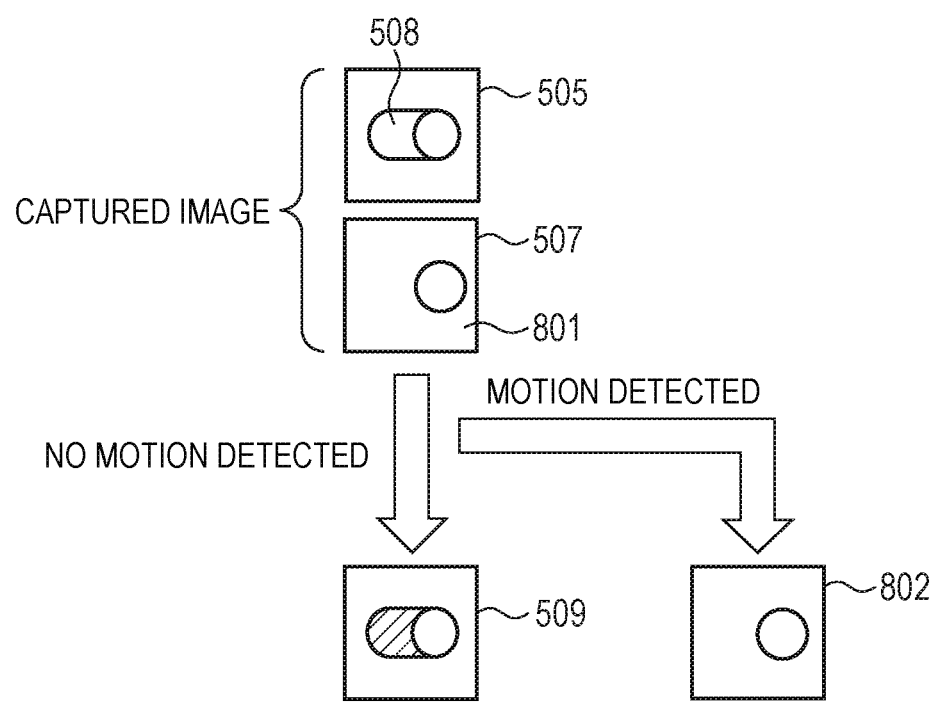
FIG. 8 is a diagram illustrating an advantageous effect in the imaging device according to the first embodiment.

As illustrated in FIG. 8, when the long-time image 505 and the short-time image 507 have been captured, a case is assumed where the residual image 508 appears in the long-time image 505 but the portion of the residual image 508 is not saturated. In this case, it is determined that the pixel value is not saturated in step S601 for the pixel of the portion of the residual image 508, the process proceeds to steps S603. In step S603, comparison between the pixel value of the long-time image 505 and the pixel value of the short-time image 507 is performed in the motion detection unit 201. At this time, the portion of the residual image 508 of the long-time image 505 has a pixel value in accordance with an image in which the residual image of a moving object and the background are overlapped, and the corresponding portion of the short-time image 507 has a pixel value in accordance with an image of a background 801. It is therefore determined in the motion detection unit 201 that the portion of the residual image 508 of the long-time image 505 has no correlation with the long-time image 505 and the short-time image 507, that is, the object or the imaging device is moving, and the process proceeds to step S605. In step S605, the pixel value of the portion of the residual image 508 is then replaced with a value in accordance with the pixel value of the short-time image 507. Thereby, a desired HDR composite image 802 including no residual image can be obtained.

Although the imaging device according to the present embodiment basically performs the HDR composition process in accordance with the procedure described above, it is preferable to suitably change this procedure in accordance with a configuration of a color filter array provided to the pixel unit 100 or the like. Four types of imaging devices 1 having different configurations of a color filter are illustrated here as an example, and procedures of an HDR composition process suitable for these imaging devices will be described.

FIG. 9A to FIG. 9D are diagrams illustrating a configuration example of an optical filter provided to the pixel unit 100 of the imaging element 1. FIG. 9A to FIG. 9D each illustrate an optical filter arranged on 16 adjacent pixels 10 of four rows by four columns out of the plurality of pixels 10 forming the pixel unit 100.

FIG. 9A illustrates a case of a monochrome sensor. The pixel unit 100 of a monochrome sensor is formed of a plurality of pixels 10 having the same optical characteristics. That is, the monochrome sensor is not necessarily required to have an optical filter, and each of the pixels may have an optical filter having the same optical transmission characteristics. In FIG. 9A, to indicate that the optical characteristics of the pixels 10 forming the pixel unit 100 are the same, each pixel is denoted with "Mono".

FIG. 9B illustrates a case of a color sensor having a color filter of so-called Bayer arrangement. In the sensor having a color filter of the Bayer arrangement, unit pixel blocks each made of four pixels 10 of two rows by two columns are arranged repeatedly in the row direction and the column direction. Out of the four pixels 10 forming a unit pixel block, two pixels having a green filter (G) (G pixels) are arranged in one diagonal direction, and a pixel having a red filter (R) (R pixel) and a pixel having a blue filter (B) (B pixel) are arranged in the other diagonal direction.

FIG. 9C illustrates a case of a color sensor having a color filter of RGBIR arrangement. The sensor having a color filter of the RGBIR arrangement is a sensor in which one of the two G pixels forming a unit pixel block of the Bayer arrangement is replaced with a pixel used for near-infrared detection (infrared (IR) pixel).

FIG. 9D illustrates a case of a color sensor having a color filter of RGBW12 arrangement. In the sensor having a color filter of the RGBW12 arrangement, unit pixel blocks each made of 16 pixels 10 of four rows by four columns are arranged repeatedly in the row direction and the column direction. The RGBW12 arrangement includes R pixels, G pixels, B pixels, and pixels that directly detect incident light without separating colors (W pixels) at a ratio of 1:2:1:12.

In the case of monochrome sensor, the HDR composition process is possible in accordance with the procedure described above by using the flowchart of FIG. 6 without requiring color development.

In the sensor having the color filter of the Bayer arrangement (FIG. 9B), for example, however, a G pixel has a higher sensitivity than an R pixel or a B pixel, and the G pixel is likely to be saturated earlier than the R pixel or the B pixel in general. Thus, when HDR composition is performed by using the flow of FIG. 6 in such a sensor, while the pixel value of a short-time pixel may be used as the pixel value of a G pixel, the pixel value of a long-time pixel may be used as the pixel value of an R pixel and a B pixel. As a result, pixels for which the pixel value of a short-time image is used and pixels for which the pixel value of a long-time image is used are mixed in a unit pixel block, and a desired color may not be obtained when a color development is performed.

Figure 10:
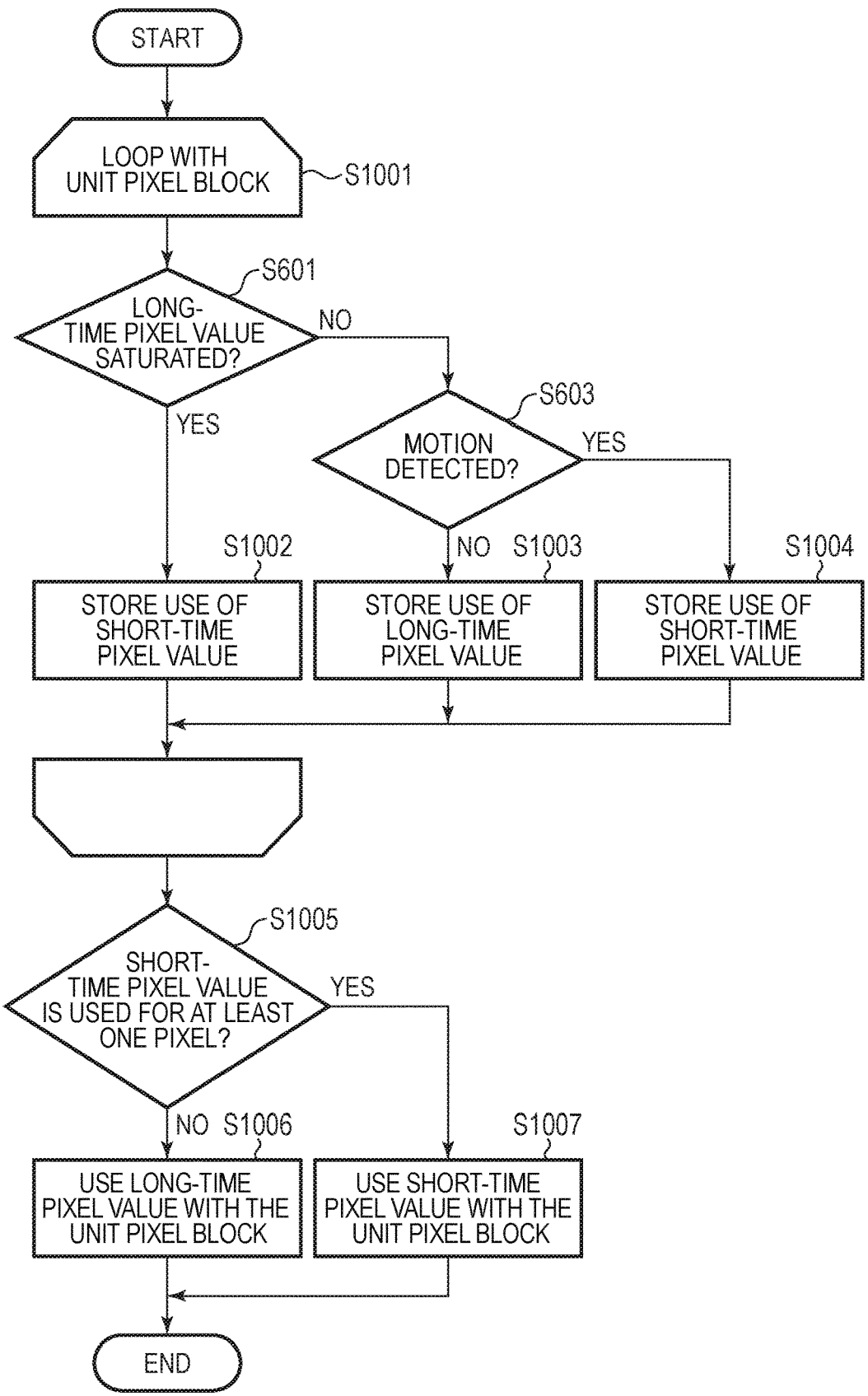
FIG. 10 is a flowchart illustrating a method of driving the imaging device according to the first embodiment.

In such a case, it is effective to perform HDR composition by using a flow illustrated in FIG. 10, for example. In the flowchart illustrated in FIG. 10, it is decided whether to use the pixel value of the long-time image 505 or the pixel value of the short-time image 507 for each unit pixel block forming a color filter array. A unit pixel block is also a unit block corresponding to a region where a color ratio is calculated in color development. Note that, in FIG. 10, steps of performing the same process as that in steps of FIG. 6 are labeled with the same references as those in FIG. 6.

First, the process from step S601 to step S1004 is performed for each of the plurality of pixels included in a unit pixel block (step S1001). For example, in the color sensor having the color filter of the Bayer arrangement illustrated in FIG. 9B, the process from step S601 to step S1004 is performed for each of the four pixels included in a unit pixel block.

In step S601, it is determined whether or not the pixel value of the long-time image 505 is saturated. As a result of the determination, if the pixel value of the long-time image 505 is saturated (YES), the process proceeds to step S1002 to store the decision to replace the pixel value of the saturated long-time image 505 with a value based on the pixel value of the short-time image 507 and use the replaced value in the HDR composition. As a result of the determination, if the pixel value of the long-time image 505 is not saturated (NO), the process proceeds to step S603.

In step S603, motion detection of the object 501 is performed, and it is determined whether or not the relative position between the object 501 and the imaging device is changing at the time of capturing. As a result of the determination, if the change in the relative position between the object 501 and the imaging device is relatively small (static) (NO), the process proceeds to step S1003 to store the decision to use the pixel value of the long-time image 505 for the HDR composition. As a result of the determination, if the change in the relative position between the object 501 and the imaging device is relatively large (moving) (YES), the process proceeds to step S1004.

In step S1004, it is stored that the pixel value of the long-time image 505 in which motion has been detected in step S603 is replaced with a value based on the pixel value of the short-time image 507 and the replaced value is used for the HDR composition.

In such a way, which of the pixel value of the long-time image 505 or the pixel value of the short-time image 507 is used is stored for all the pixels included in a unit pixel block, and the process then proceeds to step S1005.

In step S1005, it is determined whether or not pixels included in a unit pixel block include a pixel for which use of the pixel value of the short-time image 507 is stored. As a result of the determination, if the unit pixel block does not include any pixel for which use of the pixel value of the short-time image 507 is stored (NO), the process proceeds to step S1006. In step S1006, it is decided to use the pixel value of the long-time image 505 for all the pixels included in the unit pixel block of interest.

As a result of the determination in step S1005, if the unit pixel block includes at least one pixel for which use of the pixel value of the short-time image 507 is stored (YES), the process proceeds to step S1007. In step S1007, it is decided to use the pixel value of the short-time image 507 for all the pixels included in the unit pixel block of interest.

In such a way, the process from step S1001 to step S1007 is repeatedly performed for each of unit pixel blocks included in one image, and it is decided whether to use the pixel value of the long-time image 505 or the pixel value of the short-time image 507. Accordingly, it is possible to prevent the pixel value of the long-time image 505 and the pixel value of the short-time image 507 from being mixed in each of the unit pixel blocks, and it is possible to prevent a situation where a desired color is unable to be obtained in color development.

Figure 11:
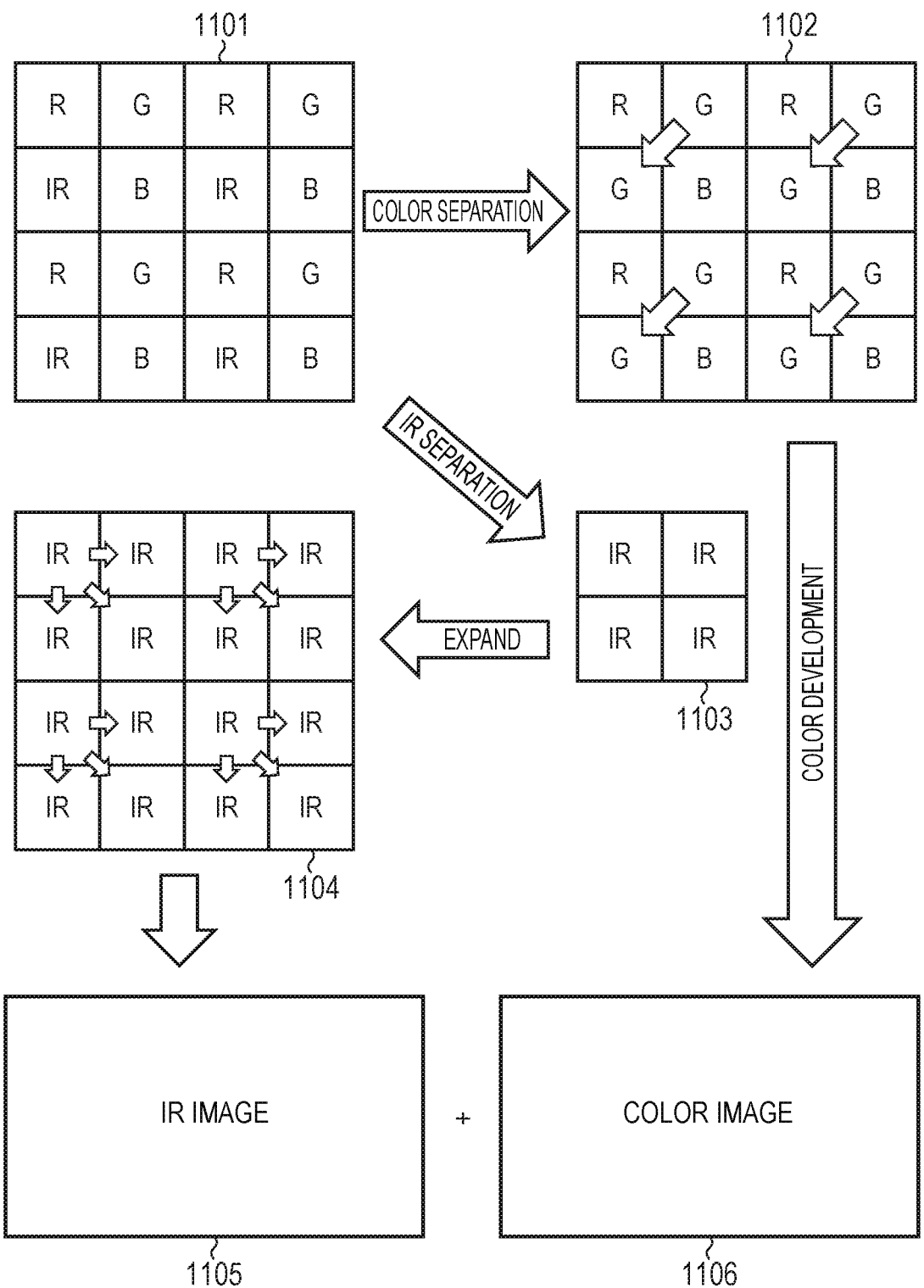
FIG. 11 is a diagram illustrating a development processing method in an imaging element having a color filter of RGBIR arrangement.

In the sensor having the color filter of the RGBIR arrangement (FIG. 9C), a development processing or the like is performed by a method illustrated in FIG. 11, for example.

First, data 1101 including pixel values of R pixels, G pixels, B pixels, and IR pixels is separated into data including pixel values of the R pixels, the G pixels, and the B pixels and data 1103 including pixel values of the IR pixels (color separation and IR separation in FIG. 11).

Next, in the color-separated data, the pixel value of portions lost due to separation of the pixel values of the IR pixels is filled with the pixel value of the G pixel included in the corresponding unit pixel block to generate data 1102. Note that the method of filling a pixel value of a lost portion is not particularly limited and is selected in accordance with a desired image.

Further, the image size of IR-separated data 1103 is reduced to one-fourth the full image size and thus expanded to the same image size as the original image if necessary.

FIG. 11 illustrates data 1104 expanded to four times the data 1103. Note that the data 1103 is not necessarily required to be expanded.

In such a way, an IR image 1105 is acquired from the data 1104, the data 1102 is color-developed, and thereby a color image 1106 is acquired. The IR image 1105 and the color image 1106 acquired in such a way may be overlapped with each other for a use in searching for a suspicious object or the like.

In the development processing illustrated in FIG. 11, the pixel values of the IR pixels form an independent image (the IR image 1105). Therefore, in a color sensor having a color filter of the RGBIR arrangement, a process flow can be suitably selected in accordance with a purpose, for example, the flow of FIG. 10 is used for the pixel values of R pixels, G pixels, and B pixels, the flow of FIG. 6 is used for the pixel values of IR pixels, or the like.

Further, in the sensor having the color filter of the RGBW12 arrangement (FIG. 9D), color data is acquired from R pixels, G pixels, and B pixels, and luminance data is acquired from W pixels. The sensitivity of the W pixel is the highest of these pixels. Therefore, for example, the flow of FIG. 10 may be applied to the pixel values of R pixels, G pixels, and B pixels. Further, for example, the flow of FIG. 6 may be applied to the pixel value of W pixels. Note that the development method in a color sensor having a color filter of the RGBW12 arrangement is disclosed in Japanese Patent Application Laid-Open No. 2016-213650, for example.

Further, when the flow illustrated in FIG. 6 is used to perform an HDR composition process when a dark part is captured, "NO" is determined in step S601, because the pixel value of a long-time image is not saturated, and the process proceeds to step S603. Then, since the absolute amount of accumulated charge is small when a dark part is captured, the pixel value is not increased at a long-time exposure, and the correlation with a short-time pixel value, that is, the relationship of Equation (1) is not satisfied, and thus "moving" may be erroneously detected even in a static state. In such a case, "YES" is determined in step S603, the pixel value of a short-time image is selected. However, since the pixel value of a short-time image when a dark part is captured is a value almost close to the dark (the lower limit value of the dynamic range), if digital processing is performed on this pixel value, an image that appears with much noise is expected to be resulted.

Figure 12:
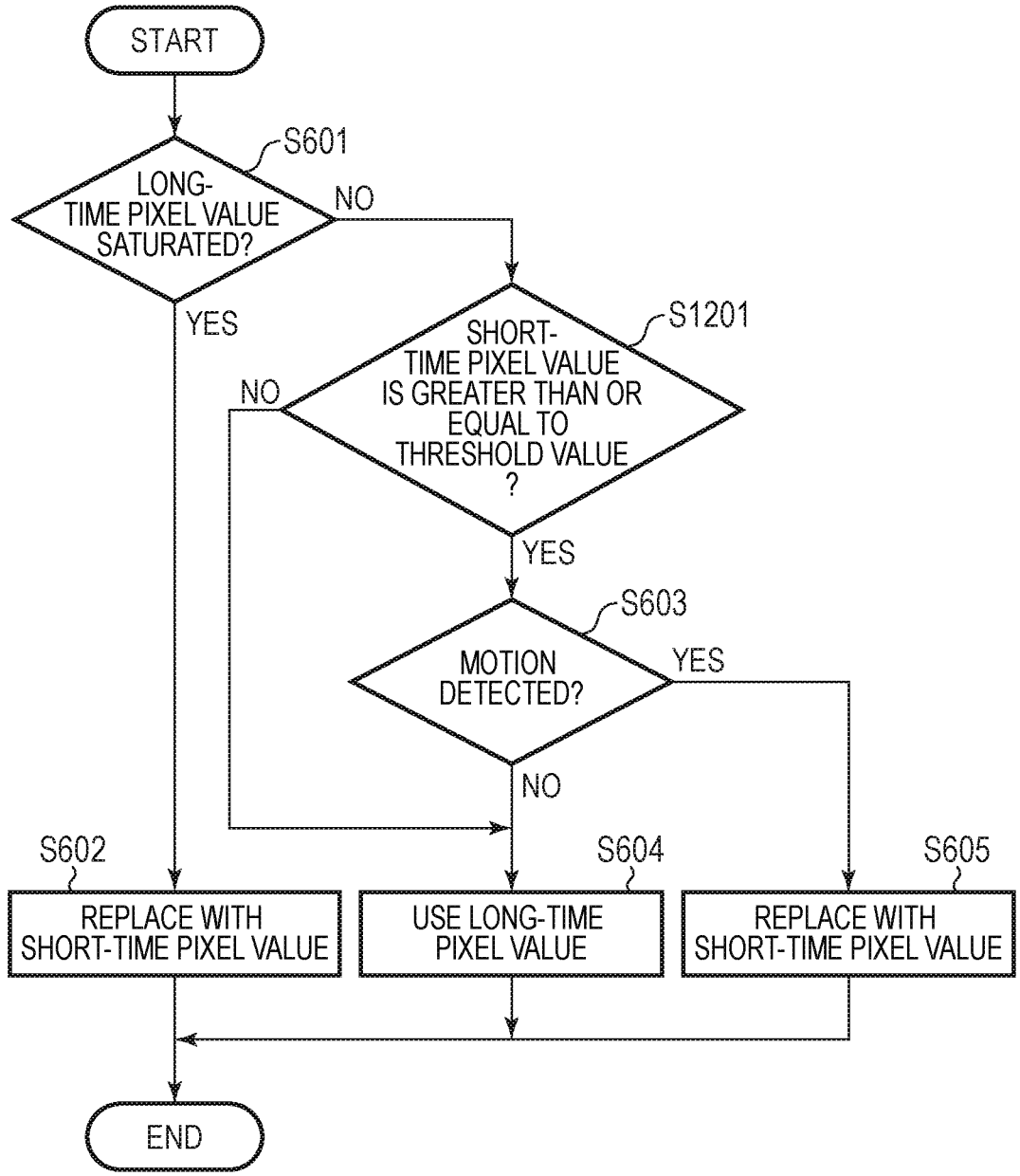
FIG. 12 is a flowchart illustrating a method of driving the imaging device according to the first embodiment.

In such a case, it is effective to perform the HDR composition by using the flow illustrated in FIG. 12, for example. The flowchart illustrated in FIG. 12 further includes step S1201 between step S601 and step S603 in the flowchart of FIG. 6.

The flow in which it is determined whether or not the pixel value of a long-time image is saturated in step S601 and, if saturated (step S601, "YES"), the pixel value is replaced with the pixel value of a short-time image in step S602 is the same as that in FIG. 6.

If the pixel value of the long-time image is not saturated (step S601, "NO"), the process proceeds to step S1201, and it is determined whether or not the pixel value of the short-time image is greater than or equal to a predetermined threshold value. This threshold value is not particularly limited and may be set to a pixel value at the lowest level which causes less noise to appear after digital processing is performed, for example.

If it is determined that the pixel value of the short-time image is less than the threshold value in step S1201 (step S1201, "NO"), the process proceeds to step S604 and decides to use the pixel value of the long-time image.

If it is determined that the pixel value of the short-time image is greater than or equal to the threshold value in step S1201 (step S1201, "YES"), the process proceeds to the motion detection in step S603 and then performs the same process as that of FIG. 6.

Figure 13:
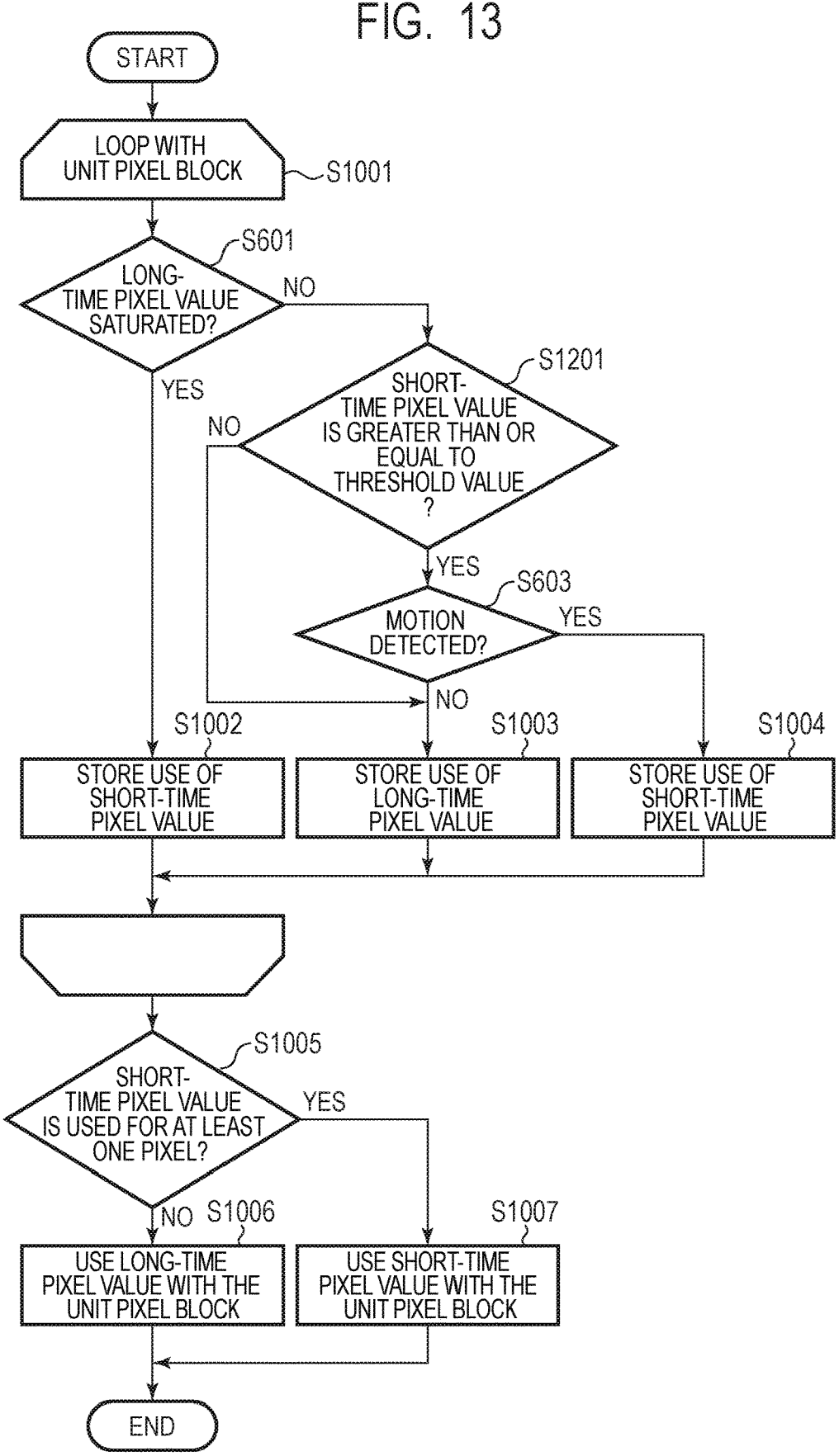
FIG. 13 is a flowchart illustrating a method of driving the imaging device according to the first embodiment.

The flow illustrated in FIG. 12 can also be applied to the sensor having any of the filter arrangement of FIG. 9A to FIG. 9D. Further, as illustrated in FIG. 13, step S1201 may be added to the flow of FIG. 10. When the filter arrangement of FIG. 9C and FIG. 9D is used, it is desirable to suitably select a pixel group to which the flow is applied.

As described above, according to the present embodiment, a good HDR image can be acquired even when the relative position between an object and the imaging device changes during capturing.

Second Embodiment

An imaging device and a method of driving the same according to a second embodiment of the disclosure will be described with reference to FIG. 14 and FIG. 15. The same components as those of the imaging device according to the first embodiment are labeled with the same references, and the description thereof will be omitted or simplified.

In HDR composition when capturing is performed in a state where the relative position between an object and an imaging device is changing, high temporal concurrency between a long-time image and a short-time image is desired. However, since the timing of long-time exposure and short-time exposure is controlled on a row basis in the imaging device in the first embodiment, the temporal concurrency in a single image is not always high. In the present embodiment, the imaging device and the method of driving the same that can perform a more suitable HDR composition process when a moving object is captured will be described.

The imaging device according to the present embodiment has the same basic configuration as the imaging device according to the first embodiment illustrated in FIG. 1 and FIG. 2 except for the circuit configuration of the pixel 10 forming the pixel unit 100 of the imaging element 1.

Figure 14:
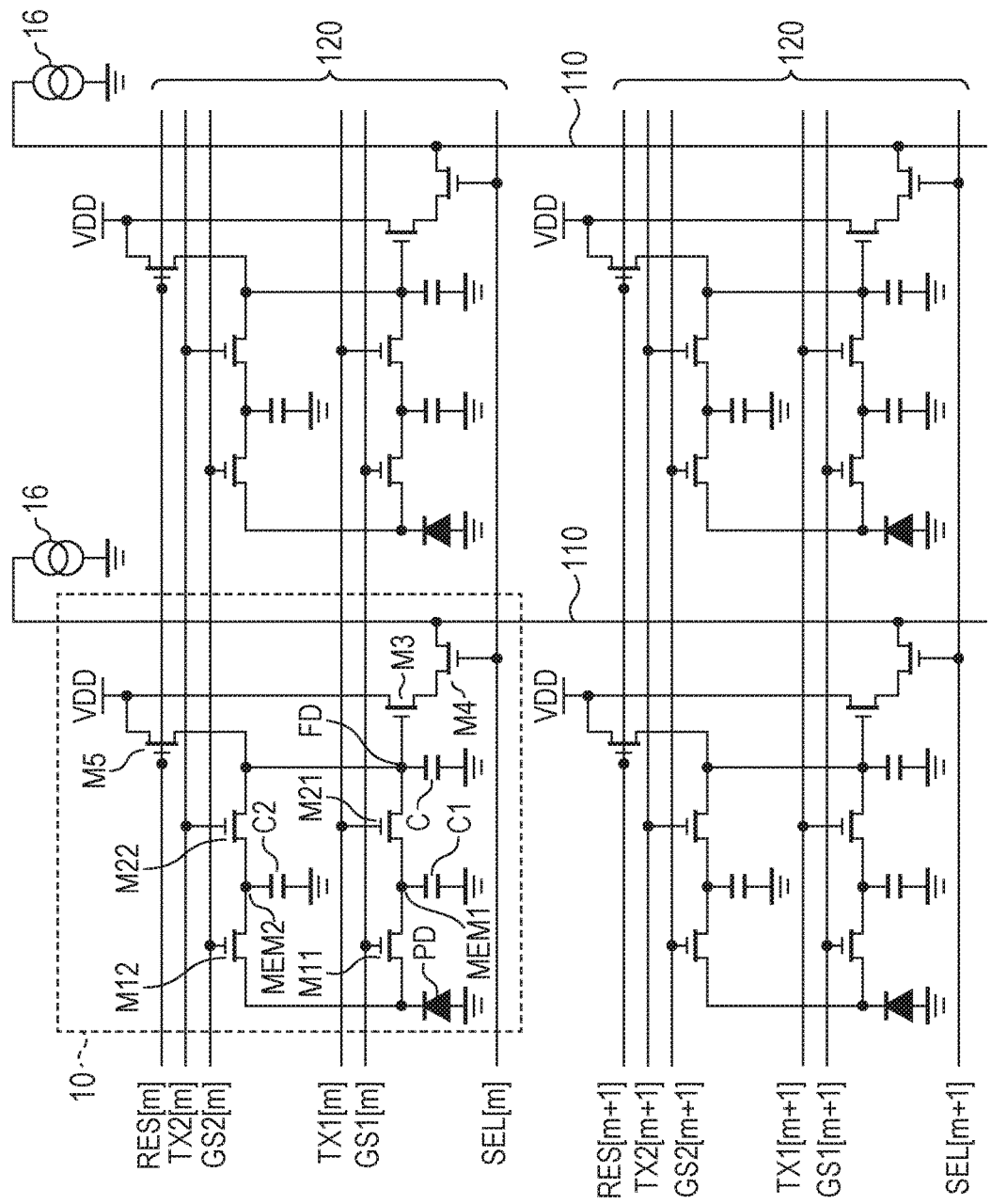
FIG. 14 is an equivalent circuit diagram illustrating a configuration example of a pixel of an imaging element in an imaging device according to a second embodiment.

FIG. 14 is an equivalent circuit diagram illustrating a configuration example of the pixel 10 of the imaging element 1 in the imaging device according to the present embodiment. FIG. 14 illustrates four pixels 10 arranged in a matrix of two rows by two columns out of the plurality of pixels 10 forming the pixel unit 100. Note that the number of pixels 10 forming the pixel unit 100 is not particularly limited.

As illustrated in FIG. 14, each of the pixels 10 of the imaging element 1 in the imaging device according to the present embodiment includes the photoelectric converter PD, transfer transistors M11, M12, M21, and M22, the amplifier transistor M3, the select transistor M4, and the reset transistor M5.

The photoelectric converter PD is a photodiode, for example. The photodiode forming the photoelectric converter PD has the anode connected to a reference voltage node and the cathode connected to the source of the transfer transistor M11 and the source of the transfer transistor M12.

The drain of the transfer transistor M11 is connected to the source of the transfer transistor M21. The connection node of the drain of the transfer transistor M11 and the source of the transfer transistor M21 includes a capacitance component and has a function of a charge holding portion MEM1. FIG. 14 illustrates this capacitance as a capacitor C1 connected to the connection node.

The drain of the transfer transistor M12 is connected to the source of the transfer transistor M22. The connection node of the drain of the transfer transistor M12 and the source of the transfer transistor M22 includes a capacitance component and has a function of a charge holding portion MEM2. FIG. 14 illustrates this capacitance as a capacitor C2 connected to the connection node.

The connection node of the drain of the transfer transistor M21, the drain of the transfer transistor M22, the gate of the amplifier transistor M3, and the source of the reset transistor M5 is the floating diffusion portion FD. The parasitic capacitance (PD capacitance) created by the floating diffusion portion FD with another wiring or a diffusion region has a function of a charge holding portion. FIG. 14 illustrates this capacitance as a capacitor C connected to the floating diffusion portion FD. The drain of the amplifier transistor M3 and the drain of the reset transistor M5 are connected to the power source node (voltage VDD). The source of the amplifier transistor M3 is connected to the drain of the select transistor M4. The source of the select transistor M4 is connected to the column signal line 110. The current source 16 is connected to the column signal line 110 on each column.

Note that, although the example in which each of the pixels 10 includes the amplifier transistor M3 is illustrated in the equivalent circuit diagram of FIG. 14, a single amplifier transistor M3 may be shared by a plurality of pixels 10. Further, an overflow drain transistor may be connected to the cathode of the photoelectric converter PD so that the photoelectric converter PD can be reset via the overflow drain transistor.

In the case of the pixel configuration of FIG. 14, the control line 120 arranged on each row includes signal lines GS1, GS2, TX1, TX2, RES, and SEL. The signal line GS1 is connected to the gate of the transfer transistors M11 of the pixels 10 belonging to a corresponding row. The signal line GS2 is connected to the gate of the transfer transistors M12 of the pixels 10 belonging to a corresponding row. The signal line TX1 is connected to the gates of the transfer transistors M21 of the pixels 10 belonging to a corresponding row. The signal line TX2 is connected to the gates of the transfer transistors M22 of the pixels 10 belonging to a corresponding row. The signal line RES is connected to the gates of the reset transistors M5 of the pixels 10 belonging to a corresponding row. The signal line SEL is connected to the gates of the select transistors M4 of the pixels 10 belonging to a corresponding row. FIG. 14 illustrates signal lines GS1[m], GS2[m], TX1[m], TX2[m], RES[m], and SEL[m] as the control line 120 connected to the pixels 10 belonging to the m-th row. Further, FIG. 14 illustrates signal lines GS1[m+1], GS2[m+1], TX1[m+1], TX2[m+1], RES[m+1], and SEL[m+1] as the control line 120 connected to the pixels 10 belonging to the (m+1)-th row.

Drive pulses used for controlling the transfer transistors M11 are output from the vertical scanning circuit 101 to the signal line GS1. Drive pulses used for controlling the transfer transistors M12 are output from the vertical scanning circuit 101 to the signal line GS2. Drive pulses used for controlling the transfer transistors M21 are output from the vertical scanning circuit 101 to the signal line TX1. Drive pulses used for controlling the transfer transistors M22 are output from the vertical scanning circuit 101 to the signal line TX2. Drive pulses used for controlling the reset transistors M5 are output from the vertical scanning circuit 101 to the signal line RES. Drive pulses used for controlling the select transistors M4 are output from the vertical scanning circuit 101 to the signal line SEL. Common drive pulses are supplied from the vertical scanning circuit 101 to the pixels 10 on the same row. When each transistor is formed of an n-channel transistor, the corresponding transistor is turned on when a high-level control signal is supplied from the vertical scanning circuit 101, and the corresponding transistor is turned off when a low-level control signal is supplied from the vertical scanning circuit 101. It is also possible to simultaneously control the exposure period of the plurality of pixels 10 by controlling the control signals on respective rows at the same time.

The photoelectric converter PD converts (photoelectrically converts) incident light into an amount of charge in accordance with the light amount and accumulates generated charge. When turned on, the reset transistor M5 resets the floating diffusion portion FD to a voltage in accordance with the voltage VDD. When turned on, the transfer transistor M11 transfers charge accumulated in the photoelectric converter PD to the holding portion MEM1. When turned on, the transfer transistor M21 transfers charge of the holding portion MEM1 to the floating diffusion portion FD. Further, when turned on, the transfer transistor M12 transfers charge accumulated in the photoelectric converter PD to the holding portion MEM2. When turned on, the transfer transistor M22 transfers charge of the holding portion MEM2 to the floating diffusion portion FD.

Accordingly, the voltage of the floating diffusion portion FD becomes a voltage in accordance with the mount of charge transferred from the holding portion MEM1 and/or the holding portion MEM2 by charge-to-voltage conversion with the capacitor C. The amplifier transistor M3 is configured such that the voltage VDD is supplied to the drain and a bias current is supplied to the source from the current source 16 via the select transistor M4 and the column signal line 110 and forms an amplifier unit (source follower circuit) whose gate is the input node. Thereby, the amplifier transistor M3 outputs a signal in accordance with the voltage of the floating diffusion portion FD to the column signal line 110 via the select transistor M4. The pixel signal output to the column signal line 110 is input to the readout circuit 102.

The pixel 10 illustrated in FIG. 14 includes the two holding portions MEM1 and MEM2 that can temporarily hold charge generated by the photoelectric converter PD. The configuration having a holding portion that temporarily holds charge separately from the photoelectric converter PD is suitable to apply a so-called global electronic shutter operation. Further, with two holding portions being provided, it is possible to use the holding portion MEM1 for holding charge accumulated in the photoelectric converter PD in a long-time exposure period and use the holding portion MEM2 for holding charge accumulated in the photoelectric converter PD in a short-time exposure period. In such a case, it is possible to set the long-time exposure period and the short-time exposure period arbitrarily by controlling the timings of transfer of charge from the photoelectric converter PD to the holding portions MEM1 and MEM2 by using the transfer transistors M11 and M12.

For example, in response to the transfer transistor M11 being turned on, charge accumulated by the photoelectric converter PD during an off-period of the transfer transistors M11 and M12 are transferred to the holding portion MEM1. When the off-period of the transfer transistors M11 and M12 is set to the long-time exposure period, charge generated by the photoelectric converter PD are transferred to the holding portion MEM1 in the long-time exposure period. Further, in response to the transfer transistor M12 being turned on, charge accumulated by the photoelectric converter PD during another off-period of the transfer transistors M11 and M12 are transferred to the holding portion MEM2. When the off-period of the transfer transistors M11 and M12 is set to the short-time exposure period, charge generated by the photoelectric converter PD are transferred to the holding portion MEM2 in the short-time exposure period. Transfer of charge from the photoelectric converter PD to the holding portions MEM1 and MEM2 may be performed in multiple times in a divided manner.

Alternatively, the transfer transistors M11 and M12 may be switched to be turned on and off so as to have opposite states to each other during an exposure period of the photoelectric converter PD. In such a case, when the total time of the periods in which the transfer transistor M11 is in the on-state is set to the long-time exposure period, charge generated by the photoelectric converter PD during the long-time exposure period are transferred to the holding portion MEM1. Further, when the total time of the periods in which the transfer transistor M12 is in the on-state is set to the short-time exposure period, charge generated by the photoelectric converter PD during the short-time exposure period are transferred to the holding portion MEM2.

Note that any order or any number of times the charge are transferred from the photoelectric converter PD to the holding portions MEM1 and MEM2 may be set.

The long-time image signal in accordance with charge held by the holding portion MEM1 can be read out via the amplifier transistor M3 and the select transistor M4 when the transfer transistor M21 is turned on to transfer charge from the holding portion MEM1 to the floating diffusion portion FD. Further, the short-time image signal in accordance with charge held by the holding portion MEM2 can be read out via the amplifier transistor M3 and the select transistor M4 when the transfer transistor M22 is turned on to transfer charge from the holding portion MEM2 to the floating diffusion portion FD.

Figure 15:
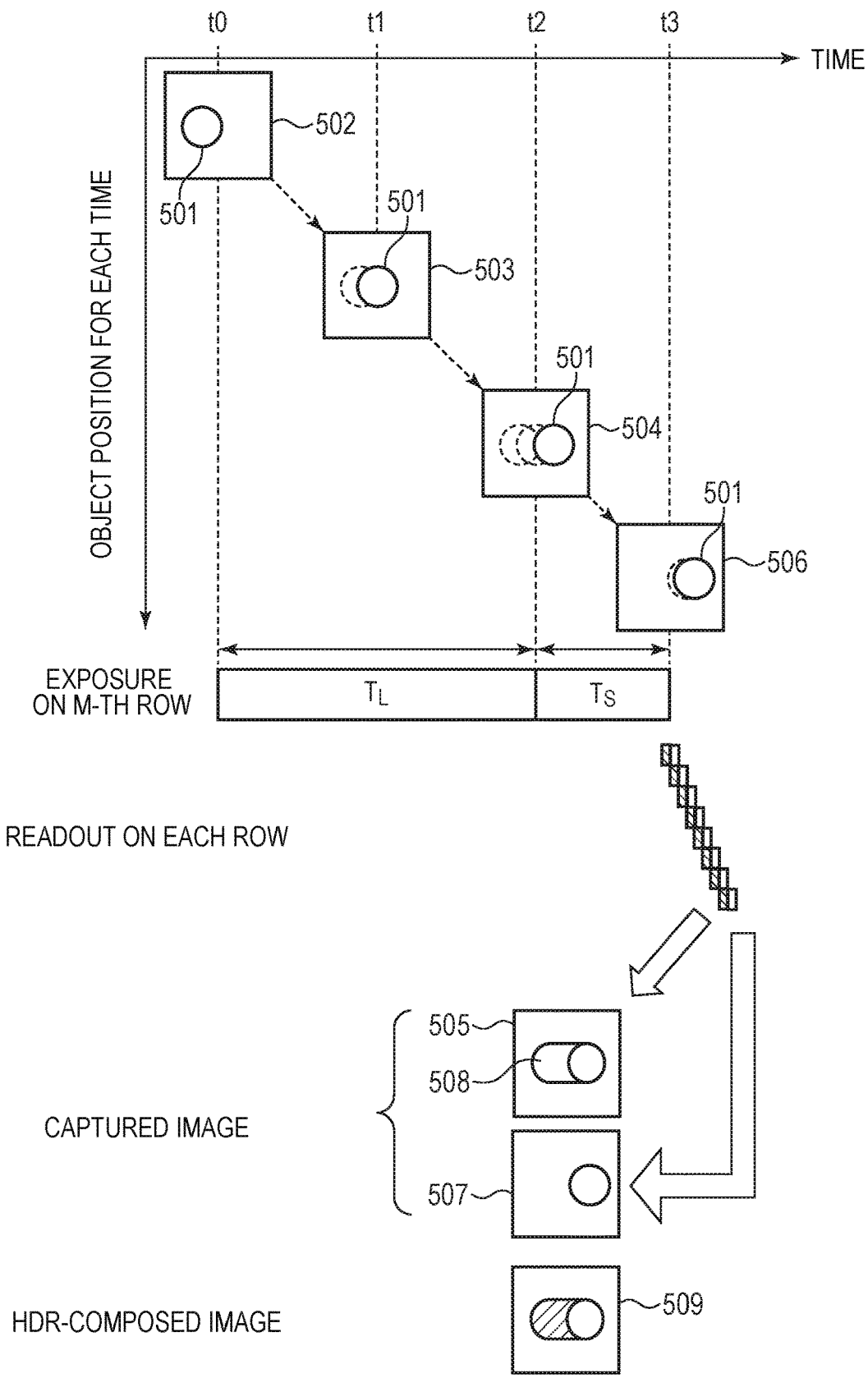
FIG. 15 is a diagram illustrating a method of driving the imaging device according to the second embodiment.

FIG. 15 is a diagram illustrating the method of driving the imaging device according to the present embodiment. The upper stage of FIG. 15 schematically illustrates the relationship between the position of an object within an image and time when a moving object is captured. To simplify the illustration here, it is assumed that the object 501 is moving at a constant speed during a period from time t0 to time t3. Further, the lower stage of FIG. 15 schematically illustrates exposure timings, readout timings, long-time images, short-time images, and an HDR composite image. Note that, in the present embodiment, the synchronization signal generation circuit 212 outputs a vertical synchronization signal at a constant cycle. That is, in the present embodiment, the length of one frame is constant.

At time t0, for example, long-time exposure in the n-th frame (long-time exposure period: $T_L$) is started, and the photoelectric converter PD starts accumulating charge in accordance with incident light.

At subsequent time t2, the transfer transistor M11 is turned on, and charge accumulated in the photoelectric converter PD during the long-time exposure period $T_L$ are transferred to the holding portion MEM1. Then, in response to the transfer transistor M11 being turned off again, the long-time exposure ends, and short-time exposure in the n-th frame (short-time exposure period: $T_S$) is started. The photoelectric converter PD restarts accumulation of charge in accordance with incident light.

At subsequent time t3, the transfer transistor M12 is turned on, and charge accumulated in the photoelectric converter PD during the short-time exposure period $T_S$ are transferred to the holding portion MEM2. Then, in response to the transfer transistor M12 being turned off again, the short-time exposure ends.

The operation from time t0 to time t3 described above is repeatedly performed on a frame basis. The driving operations of the transfer transistors M11 and M12 from time t0 to time t3 can be performed globally on all the rows.

During the photoelectric converter PD accumulating charge from time t0 to time t3 of the n-th frame, pixel signals of the (n−1)-th frame are read out on a row basis. For example, on the m-th row, the transfer transistor M21 is turned on, and charge held in the holding portion MEM1 are transferred to the floating diffusion portion FD. Thereby, the amplifier transistor M3 outputs a pixel signal based on charge generated by the photoelectric converter PD during the long-time exposure period $T_L$ to the column signal line 110 via the select transistor M4. Next, on the m-th row, the transfer transistor M22 is turned on, and charge held in the holding portion MEM2 are transferred to the floating diffusion portion FD. Thereby, the amplifier transistor M3 outputs a pixel signal based on charge generated by the photoelectric converter PD during the short-time exposure period $T_S$ to the column signal line 110 via the select transistor M4.

The signal processing unit 22 converts a pixel signal read out from the imaging element 1 by the process described above into digital data and select a suitable flow from FIG. 6, FIG. 10, FIG. 12, FIG. 13, or the like to perform the HDR composition process.

A long-time image signal and a short-time image signal read out from the imaging element 1 in the present embodiment are signals with higher temporal concurrency than that in the first embodiment. Therefore, according to the present embodiment, it is possible to acquire an HDR composite image with higher temporal concurrency than that in the first embodiment.

Third Embodiment

Figure 16:
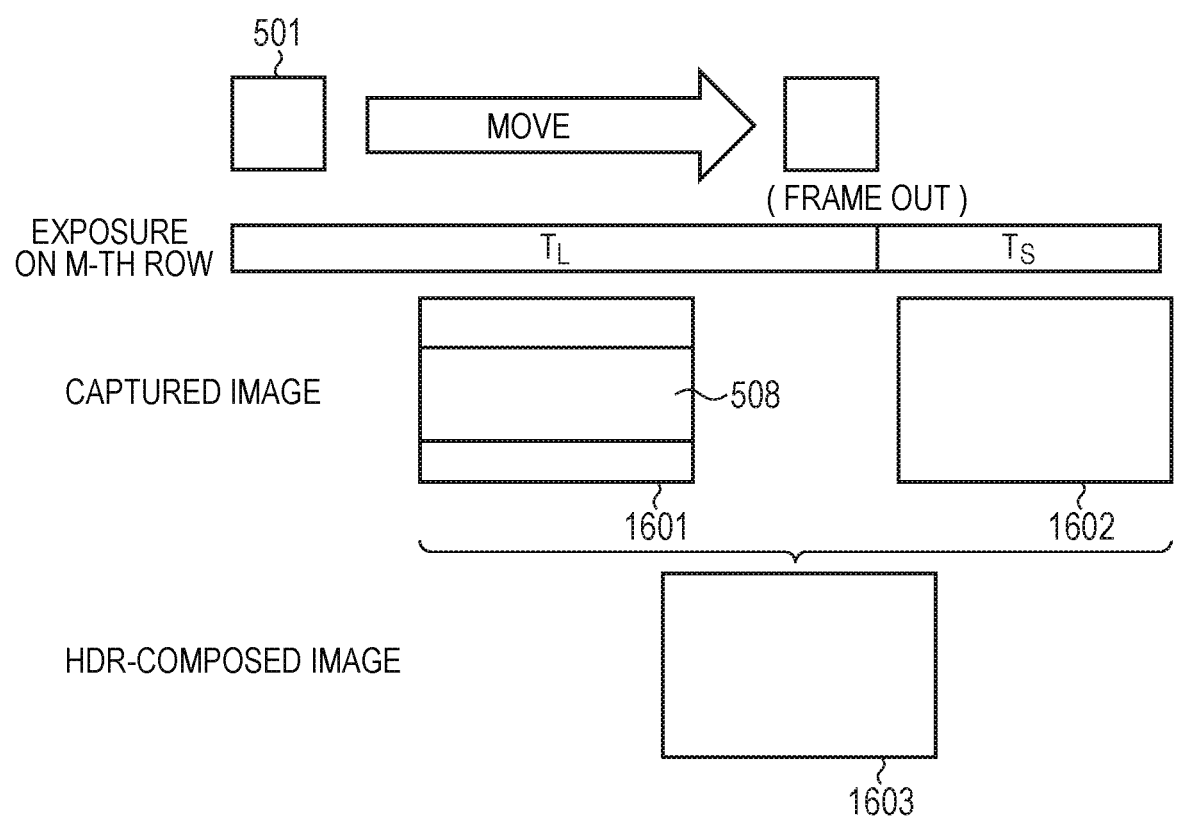
FIG. 16 is a diagram illustrating a problem during capturing of an HDR image.
Figure 17:
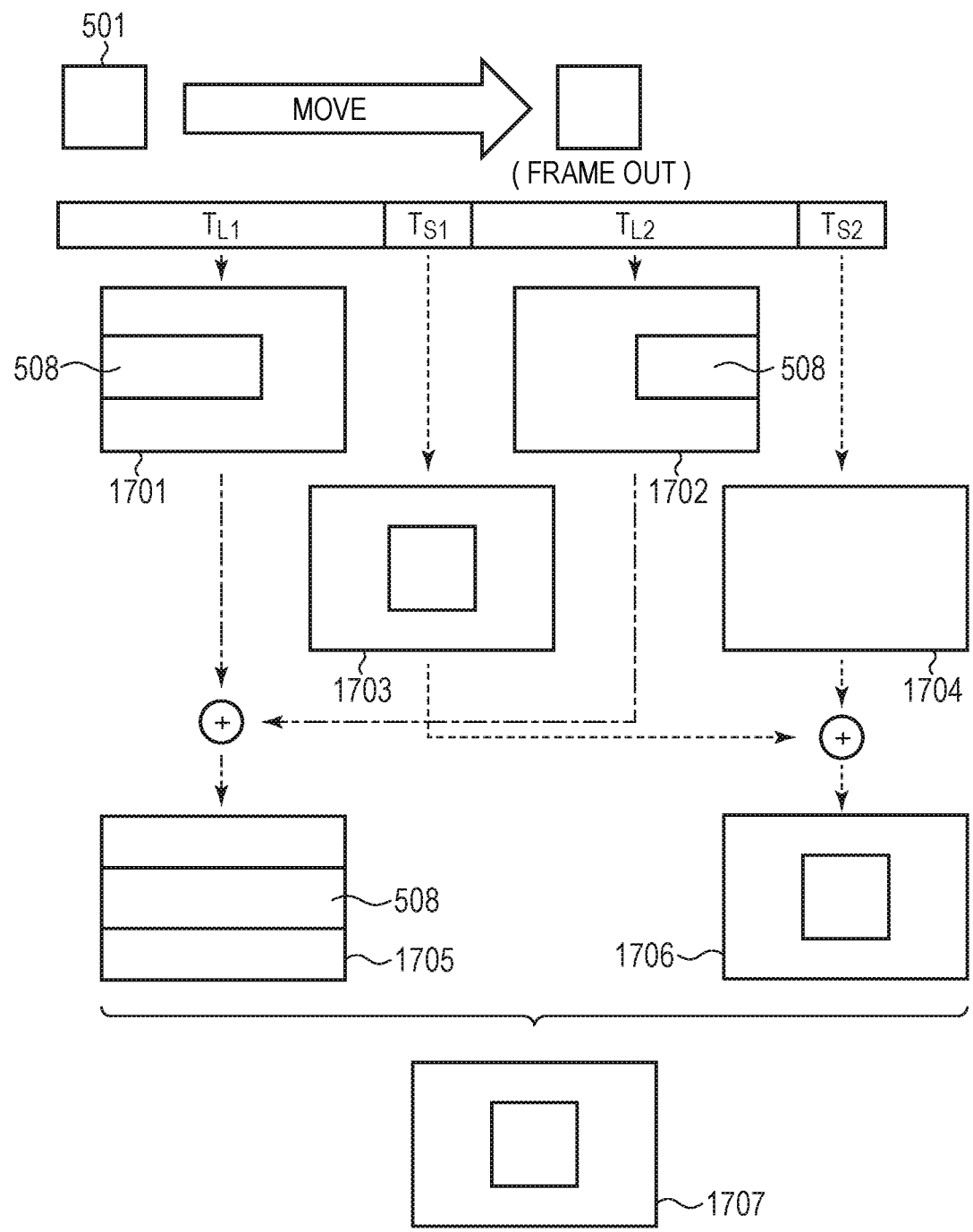
FIG. 17 is a diagram illustrating a method of driving the imaging device according to a third embodiment.

An imaging device and a method of driving the same according to a third embodiment of the disclosure will be described with reference to FIG. 16 and FIG. 17. The same components as those of the imaging device according to the first or second embodiment are labeled with the same references, and the description thereof will be omitted or simplified. FIG. 16 and FIG. 17 are diagrams illustrating the method of driving the imaging device according to the present embodiment.

In the present embodiment, another method of driving the imaging device according to the second embodiment will be described. The method of driving the imaging device according to the present embodiment is suitable for capturing an object moving faster.

FIG. 16 illustrates an example of driving when the initial value of the number of switching times of the transfer transistors M11 and M12 in one frame is set to one. That is, switching of the transfer transistors M11 and M12 is performed in the order of long-time exposure (long-time exposure period: $T_L$) and short-time exposure (short-time exposure period: $T_S$). For example, the transfer transistor M11 is set to be turned on and the transfer transistor M12 is set to be turned off during the long-time exposure period $T_L$, and the transfer transistor M11 is set to be turned off and the transfer transistor M12 is set to be turned on during the short-time exposure period $T_S$.

When the object 501 moves fast and frames out during a period of long-time exposure, only the residual image 508 is included in a long-time image 1601, and only the background is included in a short-time image 1602. When the long-time image 1601 and the short-time image 1602 are used to perform the HDR composition process by the flow of FIG. 6, if the pixel value of the long-time image is not saturated, "NO" is selected in step S601, and "YES" is selected in step S603 because of different objects. As a result, the pixel value of the short-time image 1602 is selected for the pixel value of an HDR composite image 1603 in a portion overlapping the residual image 508. That is, the HDR composite image 1603 is an image including only the background.

FIG. 17 illustrates an example of driving when the initial value of the number of switching times of the transfer transistors M11 and M12 in one frame is set to two. That is, switching of the transfer transistors M11 and M12 is performed in the order of long-time exposure (long-time exposure period: $T_{L1}$), short-time exposure (short-time exposure period: $T_{S1}$), long-time exposure (long-time exposure period: $T_{L2}$), and short-time exposure (short-time exposure period: $T_{S2}$). For example, the transfer transistor M11 is set to be turned on and the transfer transistor M12 is set to be turned off during the long-time exposure periods $T_{L1}$ and $T_{L2}$, and the transfer transistor M11 is set to be turned off and the transfer transistor M12 is set to be turned on during the short-time exposure periods $T_{S1}$ and $T_{S2}$. Herein, the long-time exposure periods $T_{L1}$ and $T_{L2}$ and the short-time exposure periods $T_{S1}$ and $T_{S2}$ are expressed by Equation (2) and Equation (3) below. That is, the framerate during capturing is the same as that in the case of FIG. 16.

$$T_L = T_{L1} + T_{L2} \quad (2)$$

$$T_S = T_{S1} + T_{S2} \quad (3)$$

Although the number of switching times of the transfer transistors M11 and M12 in one frame is two, respectively, for simplified illustration in FIG. 17, the number of switching times is not restricted and may be three or greater.

Although FIG. 17 illustrates an image 1701 resulted from charge accumulated during the long-time exposure period $T_{L1}$ and an image 1702 resulted from charge accumulated during the long-time exposure period $T_{L2}$, an actual long-time image output from the imaging element 1 is a long-time image 1705 obtained by adding these images. Similarly, although FIG. 17 illustrates an image 1703 resulted from charge accumulated during the short-time exposure period $T_{S1}$ and an image 1704 resulted from charge accumulated during the short-time exposure period $T_{S2}$, an actual short-time image output from the imaging element 1 is a short-time image 1706 obtained by adding these images.

In this example of driving, since short-time exposure (short-time exposure period $T_{S1}$) is performed while the object 501 is moving within a frame, the object 501 can be captured in the short-time image 1706 without being framed out. When the long-time image 1705 and the short-time image 1706 are used to perform the HDR composition process by the flow of FIG. 6, if the pixel value of the long-time image is not saturated, "NO" is selected in step S601, and "YES" is selected in step S603 because of different objects. As a result, although the pixel value of the short-time image 1706 is selected for the pixel value of an HDR composite image 1707 in a portion overlapping the residual image 508, the object 501 is captured also in the short-time image 1706, and thus the object 501 does not disappear from the HDR composite image 1707. The setting of the multiple times of switching of the transfer transistors M11 and M12 has an advantageous effect that the temporal centroid of an exposure period in the long-time image 1705 and the temporal centroid of an exposure period in the short-time image 1706 come close to each other.

Although the case of using the flow of FIG. 6 for the HDR composition has been illustrated as an example in the description of FIG. 16 and FIG. 17, a suitable flow may be selected for an HDR composition process from FIG. 6, FIG. 10, FIG. 12, FIG. 13, or the like in accordance with the configuration of a color filter or the like.

As described above, according to the drive method of the present embodiment, by suitably setting the number of switching times of the transfer transistors M11 and M12, it is possible to acquire a good HDR image also when capturing an object whose relative position to the imaging device changes to a relatively large degree.

Note that in the drive method of the present embodiment, the number of switching times of the transfer transistors M11 and M12 in one frame is not restricted. However, a larger number of switching times of the transfer transistors M11 and M12 may increase power consumption and, in some cases, may cause radiation noise. It is therefore desirable to suitably set the number of switching times of the transfer transistors M11 and M12 in one frame to the optimal number of times in accordance with power consumption, the level of generated noise, the cycle of a light source, or the like.

Fourth Embodiment

An imaging system according to a fourth embodiment of the disclosure will be described with reference to FIG. 18. FIG. 18 is a block diagram illustrating a general configuration of the imaging system according to the present embodiment.

The imaging device described in the first to third embodiments described above can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 18 illustrates a block diagram of a digital still camera as an example out of these examples.

An imaging system 1800 illustrated as an example in FIG. 18 includes an imaging device 1801, a lens 1802 that captures an optical image of an object onto the imaging device 1801, an aperture 1804 for changing a light amount passing through the lens 1802, and a barrier 1806 for protecting the lens 1802. The lens 1802 and the aperture 1804 form an optical system that converges a light onto the imaging device 1801. The imaging device 1801 is the imaging device described in any of the first to third embodiments and converts an optical image captured by the lens 1802 into image data.

Further, the imaging system 1800 includes a signal processing unit 1808 that processes an output signal output from the imaging device 1801. The signal processing unit 1808 performs AD conversion to convert an analog signal output from the imaging device 1801 into a digital signal. In addition, the signal processing unit 1808 performs operations of performing various correction or compression to output image data, if necessary. The AD conversion unit that is a part of the signal processing unit 1808 may be formed on a semiconductor substrate on which the imaging device 1801 is provided or formed on a semiconductor substrate separately from the imaging device 1801. Further, the imaging device 1801 and the signal processing unit 1808 may be formed on the same semiconductor substrate.

Furthermore, the imaging system 1800 includes a memory unit 1810 for temporarily storing image data therein and an external interface unit (external I/F unit) 1812 for communicating with an external computer or the like. The imaging system 1800 further includes a storage medium 1814 such as a semiconductor memory for performing storage or readout of imaging data and a storage medium control interface unit (storage medium control I/F unit) 1816 for performing storage or readout on the storage medium 1814. Note that the storage medium 1814 may be embedded in the imaging system 1800 or may be removable.

Furthermore, the imaging system 1800 includes a general control/operation unit 1818 that performs various calculation and controls the entire digital still camera and a timing generation unit 1820 that outputs various timing signals to the imaging device 1801 and the signal processing unit 1808. Here, the timing signal or the like may be input from the outside, and the imaging system 1800 may include at least the imaging device 1801 and the signal processing unit 1808 that processes an output signal output from the imaging device 1801.

The imaging device 1801 outputs an imaging signal to the signal processing unit 1808. The signal processing unit 1808 performs predetermined signal processing on an imaging signal output from the imaging device 1801 and outputs image data. The signal processing unit 1808 uses an imaging signal to generate an image.

As described above, according to the present embodiment, the imaging system to which the imaging device according to the first to third embodiments is applied can be realized.

Fifth Embodiment

Figure 19A:
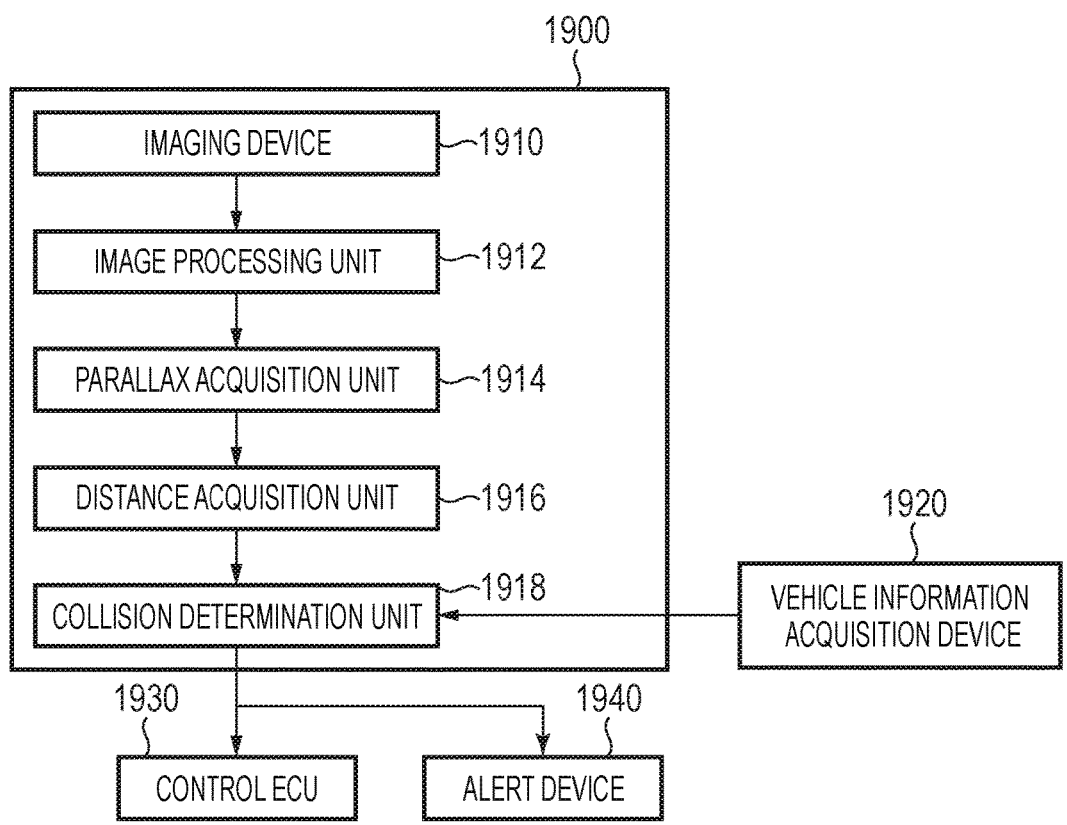
FIG. 19A is a diagram illustrating a configuration example of an imaging system according to a fifth embodiment.
Figure 19B:
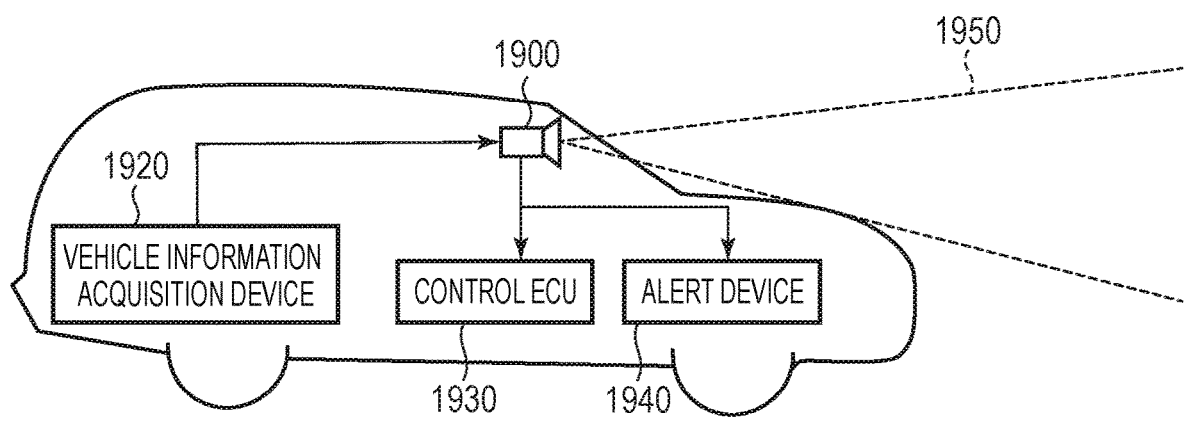
FIG. 19B is a diagram illustrating a configuration example of a movable object according to the fifth embodiment.

An imaging system and a movable object according to a fifth embodiment of the disclosure will be described with reference to FIG. 19A and FIG. 19B. FIG. 19A is a diagram illustrating a configuration of the imaging system according to the present embodiment. FIG. 19B is a diagram illustrating a configuration of the movable object according to the present embodiment.

FIG. 19A illustrates an example of an imaging system related to an on-vehicle camera. An imaging system 1900 includes an imaging device 1910. The imaging device 1910 is the imaging device described in any of the above first to third embodiments. The imaging system 1900 includes an image processing unit 1912 that performs image processing on a plurality of image data acquired by the imaging device 1910 and a parallax acquisition unit 1914 that calculates a parallax (a phase difference of parallax images) from the plurality of image data acquired by the imaging system 1900. Further, the imaging system 1900 includes a distance acquisition unit 1916 that calculates a distance to the object based on the calculated parallax and a collision determination unit 1918 that determines whether or not there is a collision possibility based on the calculated distance. Here, the parallax acquisition unit 1914 and the distance acquisition unit 1916 are an example of a distance information acquisition unit that acquires distance information on the distance to the object. That is, the distance information is information on a parallax, a defocus amount, a distance to an object, or the like. The collision determination unit 1918 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like or may be implemented by a combination thereof.

The imaging system 1900 is connected to the vehicle information acquisition device 1920 and can acquire vehicle information such as a vehicle speed, a yaw rate, a steering angle, or the like. Further, the imaging system 1900 is connected to a control ECU 1930, which is a control device that outputs a control signal for causing a vehicle to generate braking force based on a determination result by the collision determination unit 1918. Further, the imaging system 1900 is also connected to an alert device 1940 that issues an alert to the driver based on a determination result by the collision determination unit 1918. For example, when the collision probability is high as the determination result of the collision determination unit 1918, the control ECU 1930 performs vehicle control to avoid a collision or reduce damage by applying a brake, pushing back an accelerator, suppressing engine power, or the like. The alert device 1940 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 1900. FIG. 19B illustrates the imaging system when a front area of a vehicle (a capturing area 1950) is captured. The vehicle information acquisition device 1920 transmits an instruction to the imaging system 1900 or the imaging device 1910. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The disclosure is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the disclosure.

Further, although motion detection of an object is performed after saturation determination of a long-time image signal in the embodiments described above, saturation determination of a long-time image signal may be performed when motion detection of an object has not been performed. Further, although motion detection of an object is performed after threshold value determination of the pixel value of a short-time image is performed in the flow of FIG. 12, threshold value determination of the pixel value of a short-time image may be performed when motion detection of an object has been performed.

Further, although saturation determination of a long-time image signal is performed in the embodiments described above, saturation determination of a long-time image signal is not necessarily required to be performed when priority is in reduction of image quality deterioration due to motion of an object rather than improvement of a dynamic range, for example.

Further, although the color filter including R pixels, G pixels, and B pixels as multiple types of color pixels that output multiple types of color information has been illustrated in the above embodiments, the color pixels may be formed of a combination other than RGB. For example, a color filter including a C pixel having a cyan color filter, an M pixel having a magenta color filter, and a Y pixel having a yellow color filter may be employed as color pixels.

Further, although the case of the RGBW12 arrangement as filter arrangement including pixels for luminance information detection has been described in FIG. 9D, a color filter of the RGBW12 arrangement is not necessarily required to be employed. For example, a color filter of the RGBW arrangement having a different ratio of W pixels, for example, a color filter of the RGBW8 arrangement may be employed. Alternatively, a color filter of CMYW arrangement including a C pixel having a cyan CF, an M pixel having a magenta CF, a Y pixel having a yellow CF, and a W pixel may be employed.

Further, although the configuration as the pixel 10 having the two holding portions MEM1 and MEM2 has been described in the second embodiment, the pixel 10 is not necessarily required to include two holding portions. For example, when the number of times of the operation to transfer charge accumulated in the photoelectric converter PD during a long-time exposure period to a holding portion and the number of times of the operation to transfer charge accumulated in the photoelectric converter PD during a short-time exposure period to a holding portion are one, respectively, the pixel 10 only needs to include at least one holding portion.

Further, the imaging systems illustrated in the above fourth and fifth embodiments are examples of an imaging system to which the photoelectric conversion device of the disclosure may be applied, and an imaging system to which the imaging device of the disclosure can be applied is not limited to the configuration illustrated in FIG. 18 and FIG. 19A.

Embodiments of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-127445, filed Jul. 9, 2019, which is hereby incorporated by reference herein in its entirety.

What is claimed is:

1. An imaging device comprising:
a pixel unit in which a plurality of pixels each including a photoelectric converter are arranged;
a drive unit that drives the plurality of pixels to output, from each of the plurality of pixels, a first signal based on charge generated by the photoelectric converter in a first exposure period and a second signal based on charge generated by the photoelectric converter in a second exposure period that is shorter than the first exposure period;
a detection unit that detects a change in a relative position between an object and the imaging device by using the first signal and the second signal; and
an image generation unit that generates an image by using the first signal and the second signal,
wherein the image generation unit is configured to select one of the first signal and the second signal for each of the plurality of pixels in generating the image, and
wherein the image generation unit performs determination as to whether or not the first signal is saturated and, in accordance with a result of the determination, decides whether or not to use a result of detection performed by the detection unit as a criterion in selecting one of the first signal and the second signal.

2. The imaging device according to claim 1, wherein the image generation unit selects the first signal for a pixel in which the second signal is less than a predetermined threshold value regardless of a result of detection performed by the detection unit.

3. The imaging device according to claim 1,
wherein the pixel unit is formed of a plurality of unit pixel blocks, and
wherein image generation unit
applies the second signal to all of pixels belonging to a unit pixel block including at least one pixel for which the second signal is selected, and
applies the first signal to all of pixels belonging to a unit pixel block including no pixel for which the second signal is selected.

4. The imaging device according to claim 3,
wherein the plurality of pixels include multiple types of color pixels that output multiple types of color information, and
wherein the unit pixel blocks correspond to a region for which a color ratio is calculated in color development.

5. The imaging device according to claim 4, wherein the multiple types of color pixels form Bayer arrangement.

6. The imaging device according to claim 4, wherein the plurality of pixels further include a pixel used for near-infrared detection.

7. The imaging device according to claim 4, wherein the plurality of pixels further include a pixel used for luminance information detection.

8. The imaging device according to claim 1, wherein each of the plurality of pixels further includes a first holding portion that holds charge generated by the photoelectric converter in the first exposure period and a second holding portion that holds charge generated by the photoelectric converter in the second exposure period.

9. The imaging device according to claim 8,
wherein the plurality of pixels are arranged over a plurality of rows in the pixel unit, and
wherein the drive unit performs transfer of charge from the photoelectric converter to the first holding unit or the second holding unit simultaneously on the plurality of rows.

10. An imaging device comprising:
a pixel unit in which a plurality of pixels each including a photoelectric converter are arranged;
a drive unit that drives the plurality of pixels to output, from each of the plurality of pixels, a first signal based on charge generated by the photoelectric converter in a first exposure period and a second signal based on charge generated by the photoelectric converter in a second exposure period that is shorter than the first exposure period;
a detection unit that detects a change in a relative position between an object and the imaging device by using the first signal and the second signal; and
an image generation unit that generates an image by using the first signal and the second signal,
wherein, in generating the image, the image generation unit selects the first signal for a pixel for which the detection unit detects that a change in the relative position is relatively small, selects the second signal for a pixel for which the detection unit detects that a change in the relative position is relatively large, and selects the second signal for a pixel in which the first signal is saturated regardless of a result of detection performed by the detection unit.

11. The imaging device according to claim 10, wherein the image generation unit selects the first signal for a pixel in which the second signal is less than a predetermined threshold value regardless of a result of detection performed by the detection unit.

12. The imaging device according to claim 10,
wherein the pixel unit is formed of a plurality of unit pixel blocks, and
wherein image generation unit
applies the second signal to all of pixels belonging to a unit pixel block including at least one pixel for which the second signal is selected, and
applies the first signal to all of pixels belonging to a unit pixel block including no pixel for which the second signal is selected.

13. The imaging device according to claim 12,
wherein the plurality of pixels include multiple types of color pixels that output multiple types of color information, and
wherein the unit pixel blocks correspond to a region for which a color ratio is calculated in color development.

14. The imaging device according to claim 13, wherein the multiple types of color pixels form Bayer arrangement.

15. The imaging device according to claim 13, wherein the plurality of pixels further include a pixel used for near-infrared detection.

16. The imaging device according to claim 13, wherein the plurality of pixels further include a pixel used for luminance information detection.

17. The imaging device according to claim 10, wherein each of the plurality of pixels further includes a first holding portion that holds charge generated by the photoelectric converter in the first exposure period and a second holding portion that holds charge generated by the photoelectric converter in the second exposure period.

18. The imaging device according to claim 17,
wherein the plurality of pixels are arranged over a plurality of rows in the pixel unit, and
wherein the drive unit performs transfer of charge from the photoelectric converter to the first holding unit or the second holding unit simultaneously on the plurality of rows.

19. A signal processing device that processes a first signal output from each of a plurality of pixels of an imaging device and based on charge generated by a photoelectric converter in a first exposure period and a second signal output from each of the plurality of pixels of the imaging device and based on charge generated by the photoelectric converter in a second exposure period that is shorter than the first exposure period, the signal processing device comprising:
a detection unit that detects a change in a relative position between an object and the imaging device by using the first signal and the second signal; and
an image generation unit that generates an image by using the first signal and the second signal,
wherein the image generation unit is configured to select one of the first signal and the second signal for each of the plurality of pixels in generating the image, and
wherein the image generation unit performs determination as to whether or not the first signal is saturated and, in accordance with a result of the determination, decides whether or not to use a result of detection performed by the detection unit as a criterion in selecting one of the first signal and the second signal.

20. A signal processing device that processes a first signal output from each of a plurality of pixels of an imaging device and based on charge generated by a photoelectric converter in a first exposure period and a second signal output from each of the plurality of pixels of the imaging device and based on charge generated by the photoelectric converter in a second exposure period that is shorter than the first exposure period, the signal processing device comprising:
a detection unit that detects a change in a relative position between an object and the imaging device by using the first signal and the second signal; and
an image generation unit that generates an image by using the first signal and the second signal,
wherein, in generating the image, the image generation unit selects the first signal for a pixel for which the detection unit detects that a change in the relative position is relatively small, selects the second signal for a pixel for which the detection unit detects that a change in the relative position is relatively large, and selects the second signal for a pixel in which the first signal is saturated regardless of a result of detection performed by the detection unit.

21. The signal processing device according to claim 19, wherein the image generation unit selects the first signal for a pixel in which the second signal is less than a predetermined threshold value regardless of a result of detection performed by the detection unit.

22. A method of driving an imaging device including an imaging device including a plurality of pixels each including a photoelectric converter and a signal processing unit that processes a signal output from the imaging device, the method comprising:
outputting, from each of the plurality of pixels, a first signal based on charge generated by the photoelectric converter in a first exposure period and a second signal based on charge generated by the photoelectric converter in a second exposure period that is shorter than the first exposure period;
detecting a change in a relative position between an object and the imaging device by using the first signal and the second signal; and
generating an image by using the first signal and the second signal,
wherein in the step of generating an image, in selecting one of the first signal and the second signal for each of the plurality of pixels, determination is performed as to whether or not the first signal is saturated and, in accordance with a result of the determination, it is decided whether or not to use a result of detection performed by the detection unit as a criterion in selecting one of the first signal and the second signal.

23. A method of driving an imaging device including an imaging device including a plurality of pixels each including a photoelectric converter and a signal processing unit that processes a signal output from the imaging device, the method comprising:
outputting, from each of the plurality of pixels, a first signal based on charge generated by the photoelectric converter in a first exposure period and a second signal based on charge generated by the photoelectric converter in a second exposure period that is shorter than the first exposure period;
detecting a change in a relative position between an object and the imaging device by using the first signal and the second signal; and
generating an image by using the first signal and the second signal,
wherein in the step of generating an image, the first signal is selected for a pixel for which it is detected that a change in the relative position is relatively small, the second signal is selected for a pixel for which it is detected that a change in the relative position is relatively large, and the second signal is selected for a pixel in which the first signal is saturated regardless of a result of detection of motion of the object.

24. The method of driving an imaging device according to claim 22, wherein in the step of generating the image, the first signal is selected for a pixel in which the second signal is less than a predetermined threshold value regardless of a result of detection of motion of the object.

25. An imaging system comprising:
the imaging device according to claim 1; and
a signal processing unit that processes a signal output from the pixel of the imaging device.

26. A movable object comprising:
the imaging device according to claim 1;
a distance information acquisition unit that acquires distance information on a distance to an object, from a parallax image based on a signal output from the pixels of the imaging device; and
a control unit that controls the movable object based on the distance information.

27. An imaging system comprising:
the imaging device according to claim 10; and a signal processing unit that processes a signal output from the pixel of the imaging device.

28. A movable object comprising:
the imaging device according to claim 10;
a distance information acquisition unit that acquires distance information on a distance to an object, from a parallax image based on a signal output from the pixels of the imaging device; and
a control unit that controls the movable object based on the distance information.

* * * * *